US010518404B2

United States Patent
Barnes

(10) Patent No.: US 10,518,404 B2
(45) Date of Patent: Dec. 31, 2019

(54) VARIABLE FORCE EXOSKELETON HIP JOINT

(71) Applicant: Lockheed Martin Corporation, Bethesda, MD (US)

(72) Inventor: Gavin A. Barnes, St. Cloud, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 273 days.

(21) Appl. No.: 15/597,213

(22) Filed: May 17, 2017

(65) Prior Publication Data

US 2017/0246740 A1 Aug. 31, 2017

Related U.S. Application Data

(63) Continuation-in-part of application No. 14/801,941, filed on Jul. 17, 2015, now Pat. No. 10,195,736.

(51) Int. Cl.
*B25J 9/00* (2006.01)
*B25J 19/00* (2006.01)
(Continued)

(52) U.S. Cl.
CPC .......... *B25J 9/0006* (2013.01); *A61H 1/0255* (2013.01); *B25J 13/085* (2013.01);
(Continued)

(58) Field of Classification Search
CPC ........ A61H 3/00; A61H 3/008; A61H 1/0255; A61H 2201/165; B25J 13/085; B25J 19/0016; B25J 9/0006
See application file for complete search history.

(56) References Cited

U.S. PATENT DOCUMENTS 2,010,482 A 8/1935 Cobb
3,964,182 A 6/1976 Pomeret et al.
(Continued)

FOREIGN PATENT DOCUMENTS

JP  H103105191 U  10/1991
JP  3024978 U  6/1996
(Continued)

OTHER PUBLICATIONS

Final Office Action for U.S. Appl. No. 15/181,934, dated Oct. 31, 2018, 22 pages.
(Continued)

*Primary Examiner* — Daniel J Wiley
(74) *Attorney, Agent, or Firm* — Withrow & Terranova, PLLC

(57) ABSTRACT

An adjustable force exoskeleton hip joint system. The system includes a hip joint. The hip joint includes a first member rotatable about a hip joint rotation axis, the first member configured to be coupled to one of a lower body link or an upper body link. The hip joint further includes a second member rotatable about the hip joint rotation axis, the second member configured to be coupled to the other of the lower body link or the upper body link. The system further includes an adjustable force mechanism coupled to at least one of the first member and the second member. The adjustable force mechanism includes an actuator coupled to the first member, the actuator comprising a motor configured to selectively apply an adjustable force to the second member to inhibit rotation of the first member with respect to the second member.

18 Claims, 19 Drawing Sheets

(51) Int. Cl.
*B25J 13/08* (2006.01)
*A61H 1/02* (2006.01)

(52) U.S. Cl.
CPC ..... *B25J 19/0016* (2013.01); *A61H 2201/165* (2013.01); *A61H 2201/5007* (2013.01); *A61H 2201/5061* (2013.01)

(56) References Cited

U.S. PATENT DOCUMENTS

| | | | |
|---|---|---|---|
| 4,258,556 | A | 3/1981 | Ruyten et al. |
| 5,016,869 | A | 5/1991 | Dick et al. |
| 5,020,790 | A | 6/1991 | Beard et al. |
| 5,054,476 | A | 10/1991 | Petrofsky et al. |
| 5,476,441 | A | 12/1995 | Durfee et al. |
| 5,865,426 | A | 2/1999 | Kazerooni |
| 5,954,677 | A | 9/1999 | Albrecht et al. |
| 5,993,404 | A | 11/1999 | Mc Niel |
| 6,039,707 | A | 3/2000 | Crawford et al. |
| 6,886,812 | B2 | 5/2005 | Kazerooni |
| 6,913,583 | B2 | 7/2005 | Jestrabek-Hart |
| 7,153,242 | B2 | 12/2006 | Goffer |
| 7,163,518 | B1 | 1/2007 | Roche et al. |
| 7,571,839 | B2 | 8/2009 | Chu et al. |
| 7,628,766 | B1 | 12/2009 | Kazerooni et al. |
| 7,883,546 | B2 | 2/2011 | Kazerooni et al. |
| 7,947,004 | B2 | 5/2011 | Kazerooni et al. |
| 8,057,410 | B2 | 11/2011 | Angold et al. |
| 8,070,700 | B2 | 12/2011 | Kazerooni et al. |
| 8,171,570 | B2 | 5/2012 | Adarraga |
| 8,231,688 | B2 | 7/2012 | Fairbanks et al. |
| 8,257,291 | B2 | 9/2012 | Kazerooni et al. |
| 8,394,038 | B2 | 3/2013 | Ashihara et al. |
| 8,672,865 | B2 | 3/2014 | Franke et al. |
| 8,702,632 | B2 | 4/2014 | Han et al. |
| 8,801,641 | B2 | 8/2014 | Kazerooni et al. |
| 8,894,592 | B2 | 11/2014 | Amundson et al. |
| 8,945,028 | B2 | 2/2015 | Kazerooni et al. |
| 8,968,222 | B2 | 3/2015 | Kazerooni et al. |
| 9,011,354 | B2 | 4/2015 | Angold et al. |
| 9,333,644 | B2 | 5/2016 | Angold |
| 9,492,300 | B2 | 11/2016 | Bujold et al. |
| 9,662,262 | B2 | 5/2017 | Hollander et al. |
| 2003/0062241 | A1 | 4/2003 | Irby et al. |
| 2003/0073552 | A1 | 4/2003 | Knight |
| 2003/0093018 | A1 | 5/2003 | Albrecht et al. |
| 2003/0109817 | A1 | 6/2003 | Berl |
| 2003/0115954 | A1 | 6/2003 | Zemlyakov et al. |
| 2004/0237351 | A1 | 12/2004 | Howell |
| 2005/0137717 | A1 | 6/2005 | Gramnas et al. |
| 2006/0064047 | A1 | 3/2006 | Shimada et al. |
| 2006/0107433 | A1 | 5/2006 | Olson |
| 2006/0260620 | A1 | 11/2006 | Kazerooni et al. |
| 2007/0056592 | A1 | 3/2007 | Angold et al. |
| 2007/0123997 | A1 | 5/2007 | Herr et al. |
| 2007/0233279 | A1 | 10/2007 | Kazerooni et al. |
| 2008/0234608 | A1 | 9/2008 | Sankai |
| 2009/0210093 | A1 | 8/2009 | Jacobsen et al. |
| 2009/0292369 | A1 | 11/2009 | Kazerooni et al. |
| 2010/0076360 | A1 | 3/2010 | Shimada et al. |
| 2010/0094185 | A1 | 4/2010 | Amundson et al. |
| 2010/0152630 | A1 | 6/2010 | Matsuoka et al. |
| 2010/0210980 | A1 | 8/2010 | Kudoh |
| 2010/0254696 | A1 | 10/2010 | McKay |
| 2010/0324699 | A1 | 12/2010 | Herr et al. |
| 2011/0040216 | A1 | 2/2011 | Herr et al. |
| 2011/0105966 | A1 | 5/2011 | Kazerooni et al. |
| 2011/0166489 | A1 | 7/2011 | Angold et al. |
| 2011/0201978 | A1 | 8/2011 | Jeon et al. |
| 2011/0214524 | A1 | 9/2011 | Jacobsen et al. |
| 2011/0264014 | A1 | 10/2011 | Angold |
| 2011/0266323 | A1 | 11/2011 | Kazerooni et al. |
| 2012/0004736 | A1 | 1/2012 | Goldfarb et al. |
| 2012/0073165 | A1 | 3/2012 | McKeown |
| 2012/0172770 | A1 | 7/2012 | Almesfer et al. |
| 2012/0192461 | A1 | 8/2012 | Backus |
| 2012/0283845 | A1 | 11/2012 | Herr et al. |
| 2012/0292361 | A1 | 11/2012 | Thiruppathi |
| 2013/0023800 | A1 | 1/2013 | Bédard et al. |
| 2013/0102935 | A1 | 4/2013 | Kazerooni et al. |
| 2013/0150980 | A1 | 6/2013 | Swift et al. |
| 2013/0197408 | A1 | 8/2013 | Goldfarb et al. |
| 2013/0231595 | A1 | 9/2013 | Zoss et al. |
| 2013/0237884 | A1 | 9/2013 | Kazerooni et al. |
| 2013/0296746 | A1 | 11/2013 | Herr et al. |
| 2013/0303950 | A1 | 11/2013 | Angold et al. |
| 2013/0331744 | A1 | 12/2013 | Kamon |
| 2014/0001222 | A1 | 1/2014 | Vierthaler et al. |
| 2014/0046234 | A1 | 2/2014 | DeSousa |
| 2014/0094729 | A1 | 4/2014 | Lachance et al. |
| 2014/0200491 | A1 | 7/2014 | Julin et al. |
| 2014/0207017 | A1 | 7/2014 | Gilmore et al. |
| 2014/0276264 | A1 | 9/2014 | Caires et al. |
| 2014/0330431 | A1 | 11/2014 | Hollander et al. |
| 2014/0358053 | A1 | 12/2014 | Triolo et al. |
| 2015/0001269 | A1 | 1/2015 | Sacksteder |
| 2015/0081036 | A1 | 3/2015 | Nakanishi et al. |
| 2015/0134080 | A1 | 5/2015 | Roh |
| 2015/0173992 | A1 | 6/2015 | Wang |
| 2015/0272501 | A1 | 10/2015 | MacEachern et al. |
| 2015/0272809 | A1 | 10/2015 | Accoto et al. |
| 2015/0313786 | A1 | 11/2015 | Sano |
| 2015/0321340 | A1 | 11/2015 | Smith |
| 2015/0366694 | A1 | 12/2015 | Bujold et al. |
| 2016/0015589 | A1 | 1/2016 | Lee et al. |
| 2016/0016307 | A1 | 1/2016 | Choi et al. |
| 2016/0038313 | A1 | 2/2016 | Kim et al. |
| 2016/0038371 | A1 | 2/2016 | Sandler et al. |
| 2016/0058647 | A1 | 3/2016 | Maddry |
| 2016/0067550 | A1 | 3/2016 | Breach et al. |
| 2016/0184165 | A1 | 6/2016 | Ohta et al. |
| 2016/0262969 | A1 | 9/2016 | Ohta et al. |
| 2017/0014297 | A1 | 1/2017 | Grygorowicz et al. |
| 2017/0014993 | A1 | 1/2017 | Barnes |
| 2017/0061828 | A1 | 3/2017 | Artemiadis et al. |
| 2017/0181917 | A1 | 6/2017 | Ohta et al. |
| 2017/0303849 | A1 | 10/2017 | De Sapio et al. |

FOREIGN PATENT DOCUMENTS

| | | | |
|---|---|---|---|
| JP | 2003104682 | A | 4/2003 |
| JP | 200911818 | A | 1/2009 |
| KR | 101570679 | B1 | 11/2015 |
| WO | 2012154580 | A1 | 11/2012 |
| WO | 2013116900 | A1 | 8/2013 |
| WO | 2014125387 | A2 | 8/2014 |
| WO | 2014159608 | A1 | 10/2014 |
| WO | 2016029159 | A2 | 2/2016 |
| WO | 2017025363 | A1 | 2/2017 |

OTHER PUBLICATIONS

Non-Final Office Action for U.S. Appl. No. 15/359,806, dated Nov. 16, 2018, 12 pages.
U.S. Appl. No. 13/084,265, filed Apr. 11, 2011, now U.S. Pat. No. 9,333,644.
U.S. Appl. No. 14/801,941, filed Jul. 17, 2015.
U.S. Appl. No. 14/744,855, filed Jun. 19, 2015.
U.S. Appl. No. 15/181,934, filed Jun. 14, 2016.
U.S. Appl. No. 14/744,892, filed Jun. 19, 2015.
U.S. Appl. No. 15/371,709, filed Dec. 7, 2016.
U.S. Appl. No. 15/359,806, filed Nov. 23, 2016.
Notice of Allowance for U.S. Appl. No. 15/371,709, dated Jul. 13, 2018, 10 pages.
Notice of Allowance for U.S. Appl. No. 14/801,941, dated Sep. 19, 2018, 8 pages.
International Search Report and Written Opinion for International Patent Application No. PCT/US2018/032940, dated Sep. 12, 2018, 17 pages.
Non-Final Office Action for U.S. Appl. No. 15/181,934, dated Mar. 27, 2018, 17 pages.
International Preliminary Report on Patentability for PCT/US2016/042427, dated Jan. 23, 2018, 13 pages.

(56) References Cited

OTHER PUBLICATIONS

Non-Final Office Action for U.S. Appl. No. 14/801,941, dated Apr. 25, 2018, 9 pages.
Whitwam, Ryan, et al., "Banks now have money-grabbing robotic exoskeletons that are probably helpful for robbing banks," PCMag Digital Group, May 9, 2015, Ziff Davis, LLC, www.geek.com/?s=japanese+banks+now+have+money+grabbing&x=0&y=0, 4 pages.
Non-Final Office Action for U.S. Appl. No. 13/084,265, dated Sep. 10, 2015, 7 pages.
Extended European Search Report for European Patent Application No. 11766862.4, dated May 27, 2014, 4 pages.
Notice of Reasons for Refusal for Japanese Patent Application No. 2013-504019, dated Feb. 24, 2015, 6 pages.
International Search Report for PCT/US2011/031956, dated Jun. 21, 2011, 2 pages.
International Preliminary Report on Patentability for PCT/US2011/031956, dated Oct. 9, 2012, 6 pages.
Supplemental Notice of Allowability for U.S. Appl. No. 13/084,265, dated Jan. 25, 2016, 3 pages.
Notice of Reasons for Refusal for Japanese Patent Application No. 2013-504019, dated Dec. 22, 2015, 6 pages.
Decision to Grant for Japanese Patent Application No. 2013-504019, dated Aug. 16, 2016, 6 pages.
International Search Report and Written Opinion for International Patent Application No. PCT/US2016/042427, dated Oct. 24, 2016, 18 pages.
Artemiadis, Panagiotis K. et al., "EMG-based Position and Force Estimates in Coupled Human-Robot Systems: Towards EMG-controlled Exoskeletons," Experimental Robotics: The Eleventh International Symposium (book), vol. 54, 2009, Springer Berlin Heidelberg, pp. 1-10.
Ferris, Daniel P. et al., "An Ankle-Foot Orthosis Powered by Artificial Muscles" Journal of Applied Biomechanics, vol. 21, Issue 2, May 2005, Human Kinetics, Inc., 3 pages.
Ferris, Dan et al., "An Improved Ankle-Foot Orthosis Powered by Artificial Pneumatic Muscles," XIXth Congress of the International Society of Biomechanics: the human body in motion, Jul. 6-11, 2003, Dunedin, New Zealand, University of Otago, 17 pages.
Ferris, Daniel P. et al., "Development of a myoelectrically controlled lower limb orthosis for human locomotion," Proceedings of the NCMRR Symposium "Medical Rehab on the Move: Spotlight on BioEngineering," Abstract, Jan. 4-5, 2001, Bethesda, Maryland, Supported by NIH AR08602 and U.S. Dept. of Veterans Affairs Center Grant #A0806C, 2 pages.
Gordon, Keith E. et al., "Motor Adaptation During Walking with a Powered Ankle Foot Orthosis," Journal of NeuroEngineering and Rehabilitation, vol. 4, 2007, BioMed Central Ltd, 2 pages.
Kawamoto, Hiroaki et al., "Power Assist Method for HAL-3 using EMG-based Feedback Controller," IEEE International Conference on Systems, Man and Cybernetics, Oct. 8, 2003, IEEE, pp. 1648-1653.
Sawicki, Gregory S. et al., "A Knee-Ankle-Foot Orthosis (KAFO) Powered by Artificial Pneumatic Muscles," XIXth congress of the International Society of Biomechanics: the human body in motion, Jul. 6-11, 2003, Dunedin, New Zealand, 1 page.
Sawicki, Gregory S. et al., "Mechanics and energetics of level walking with powered ankle exoskeletons," The Journal of Experimental Biology, vol. 211, Feb. 19, 2009, The Company of Biologists, pp. 1402-1413.
Non-Final Office Action and Examiner-Initiated Interview Summary for U.S. Appl. No. 14/744,892, dated Feb. 17, 2017, 44 pages.
Notice of Allowance and Notice Requiring Inventor's Oath or Declaration for U.S. Appl. No. 14/744,892, dated Jul. 5, 2017, 11 pages.
Corrected Notice of Allowance for U.S. Appl. No. 14/744,892, dated Jul. 14, 2017, 7 pages.
Advisory Action and AFCP 2.0 Decision for U.S. Appl. No. 15/181,934, dated Jan. 9, 2019, 4 pages.
Non-Final Office Action for U.S. Appl. No. 15/181,934, dated Feb. 26, 2019, 23 pages.
Partial Supplementary European Search Report for European Patent Application No. 16828290.3, dated Mar. 1, 2019, 12 pages.
International Search Report and Written Opinion for International Patent Application No. PCT/US2018/048517, dated Dec. 31, 2018, 13 pages.
Interview Summary for U.S. Appl. No. 15/181,934, dated Apr. 12, 2019, 11 pages.
Non-Final Office Action for U.S. Appl. No. 14/744,855, dated Apr. 25, 2019, 9 pages.
Final Office Action for U.S. Appl. No. 15/359,806, dated May 31, 2019, 14 pages.
Written Opinion for Singaporean Patent Application No. 11201800019U, dated Mar. 12, 2019, 7 pages.
Author Unknown, "Definition of avoid," Merriam-Webster Dictionary, 2019, accessed online from https://www.merriam-webster.com/dictionary/avoid, Merriam-Webster, Inc., 4 pages.
Notice of Allowance and Examiner-Initiated Interview Summary for U.S. Appl. No. 15/181,934, dated Jul. 16, 2019, 17 pages.
Final Office Action for U.S. Appl. No. 14/744,855, dated Aug. 13, 2019, 9 pages.
Notice of Allowance and AFCP 2.0 Decision for U.S. Appl. No. 14/744,855, dated Oct. 9, 2019, 9 pages.
Extended European Search Report for European Patent Application No. 16828290.3, dated Aug. 14, 2019, 11 pages.

VARIABLE FORCE EXOSKELETON HIP JOINT

RELATED APPLICATION

This application is a continuation-in-part of co-pending U.S. patent application Ser. No. 14/801,941, filed on Jul. 17, 2015, entitled "VARIABLE FORCE EXOSKELETON HIP JOINT," the disclosure of which is incorporated herein by reference in its entirety.

TECHNICAL FIELD

The embodiments relate to exoskeletons and, in particular, to a variable force exoskeleton hip joint.

BACKGROUND

An exoskeleton is often used by an individual to support a workload, such as a tool or other device, directly in front of or behind the individual. An exoskeleton may have a counterbalance mechanism that allows adjustable counterweights to be applied to offset the workload. However, particularly in unpowered exoskeletons, as the individual moves the exoskeleton, the individual must also move the combined weight of the workload and the weight of the counterweights. For relatively heavy workloads, and consequently relatively heavy counterweights, the total amount of weight that must necessarily be manipulated can contribute to user discomfort and can become a safety risk.

SUMMARY

The embodiments relate to a variable force exoskeleton hip joint having a rotation axis. The variable force exoskeleton hip joint includes an adjustable force mechanism that is configured to apply an adjustable force to an upper body link of an upper body exoskeleton with respect to a lower body link of a lower body exoskeleton to hinder rotation of the upper body exoskeleton with respect to the lower body exoskeleton in a rotational direction. Among other advantages, the variable force exoskeleton hip joint counters the weight of an item carried in front of or behind the exoskeleton without a need for counterweights, resulting in a lower weight for a user to manipulate when moving the exoskeleton.

According to one embodiment, a system is disclosed. The system includes a hip joint. The hip joint includes a first member rotatable about a hip joint rotation axis, the first member configured to be coupled to one of a lower body link or an upper body link. The hip joint further includes a second member rotatable about the hip joint rotation axis, the second member configured to be coupled to the other of the lower body link or the upper body link. The system further includes an adjustable force mechanism coupled to at least one of the first member and the second member. The adjustable force mechanism includes an actuator coupled to the first member, the actuator including a motor configured to selectively apply an adjustable force to the second member to inhibit rotation of the first member with respect to the second member.

According to another embodiment, an exoskeleton is disclosed. The exoskeleton includes an upper body exoskeleton including an upper body link. The exoskeleton further includes a lower body exoskeleton including a lower body link. The exoskeleton further includes a hip joint. The hip joint includes a first member rotatable about a hip joint rotation axis, the first member coupled to one of the lower body link or the upper body link. The hip joint further includes a second member rotatable about the hip joint rotation axis, the second member coupled to the other of the lower body link or the upper body link. The exoskeleton further includes an adjustable force mechanism coupled to at least one of the first member and the second member. The adjustable force mechanism includes an actuator coupled to the first member, the actuator including a motor configured to selectively apply an adjustable force to the second member to inhibit rotation of the upper body exoskeleton with respect to the lower body exoskeleton.

According to another embodiment, a method of operating a hip joint of an exoskeleton is disclosed. The method includes determining, by a controller, a torque associated with a hip joint of an exoskeleton. The hip joint includes a first member configured to be coupled to one of a lower body link or an upper body link and a second member rotatable with respect to the first member. The second member is configured to be coupled to the other of the lower body link or the upper body link. The method further includes operating a motor coupled to one of the first member or the second member to selectively apply an adjustable force to the other of the first member or the second member in response to the determined torque to inhibit rotation of the upper body connection location with respect to the lower body connection location.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first member" and "second member" and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to a variable force exoskeleton hip joint having a rotation axis. The variable force exoskeleton hip joint includes an adjustable force mechanism that is configured to apply an adjustable force to an upper body link of an upper body exoskeleton with respect to a lower body link of a lower body exoskeleton to hinder rotation of the upper body exoskeleton with respect to the lower body exoskeleton in a rotational direction. Among other advantages, the variable force exoskeleton hip joint counters the weight of an item carried in front of or behind the exoskeleton without a need for counterweights, resulting in a lower weight for a user to manipulate when moving the exoskeleton.

Figure 1:
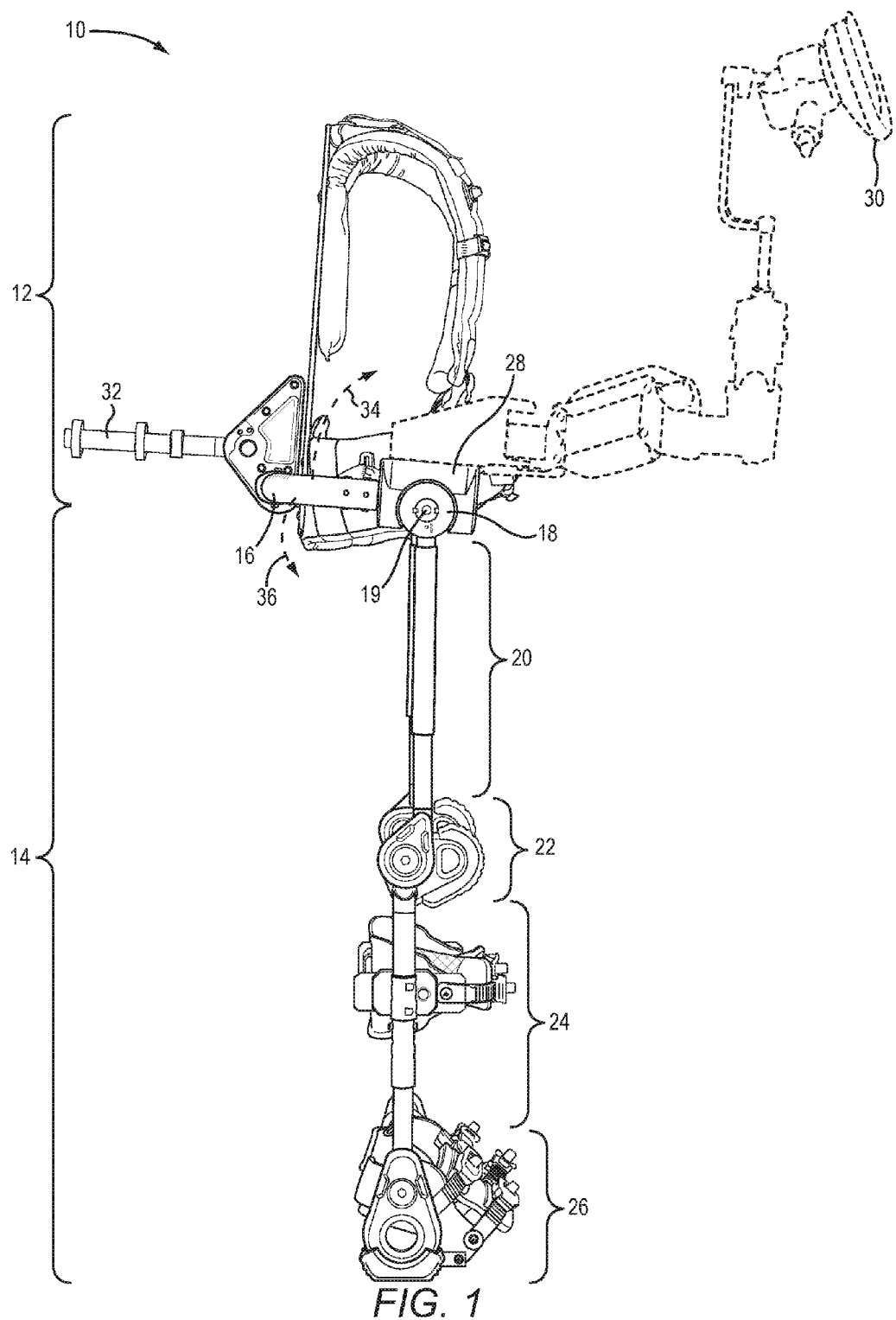
FIG. 1 is a side view of an exoskeleton according to one embodiment.

FIG. 1 is a side view of an exoskeleton 10 according to one embodiment. The exoskeleton 10 includes an upper body exoskeleton 12 and a lower body exoskeleton 14. The upper body exoskeleton 12 includes an upper body link 16, sometimes referred to as a hip arc, that is coupled to a hip joint 18. The hip joint 18 includes a rotation axis 19 that is perpendicular to a sagittal plane of a user about which the upper body link 16, and the upper body exoskeleton 12, can at least partially rotate. In the orientation illustrated in FIG. 1, the lower portion of the upper body exoskeleton 12 includes the upper body link 16, and the lower body exoskeleton 14 is that portion of the exoskeleton 10 that is below the upper body link 16. The upper body link 16 at least partially encloses the hips of the user (not illustrated for purposes of clarity) and, in operation, is generally in a substantially horizontal plane.

The hip joint 18 is also coupled to a lower body link 20 of the lower body exoskeleton 14. The lower body link 20, in this example, is a thigh link, but in other embodiments, the lower body link 20 may a pelvic link. The lower body link 20, in the orientation illustrated in FIG. 1, in operation is generally in a vertical plane. The lower body link 20 and the lower body exoskeleton 14 can at least partially rotate in the sagittal plane about the rotation axis 19 of the hip joint 18.

In this embodiment, the lower body exoskeleton 14 includes a knee joint 22. The knee joint 22 is also connected to a calf link 24 that extends a distance along a calf of the user, and terminates at or near a floor. In some embodiments, the calf link 24 may terminate in a foot rocker 26 that, in operation, contacts the floor. In some embodiments, the foot rocker 26 comprises a foot link, which is positioned under a foot of the user.

The exoskeleton 10 may also include a tool assembly connector 28 that is configured to support a tool 30 for operation by the user. The tool assembly connector 28, in this example, is illustrated as being integrated with the hip joint 18. The weight of the tool 30 creates a moment of force about the rotation axis 19. In conventional exoskeletons, this moment of force is countered by placing one or more weights on a weight extension 32 that is coupled to the upper body link 16. Heavy tools 30 require heavy weights on the weight extension 32, can make the exoskeleton 10 difficult to manipulate for the user, and in some circumstances may become a safety concern.

As will be discussed in greater detail below, the hip joint 18 may reduce or eliminate the need for weights by allowing the user to manipulate a user adjustable force mechanism of the hip joint 18 to hinder rotation of the upper body link 16 about the rotation axis 19 with respect to the lower body link 20 in a rotational direction 34. In other embodiments, for example in an exoskeleton wherein the user carries a workload on a back portion of the upper body exoskeleton 12, the hip joint 18 may be arranged to hinder rotation of the upper body link 16 about the rotation axis 19 with respect to the lower body link 20 in a rotational direction 36.

Figure 2:
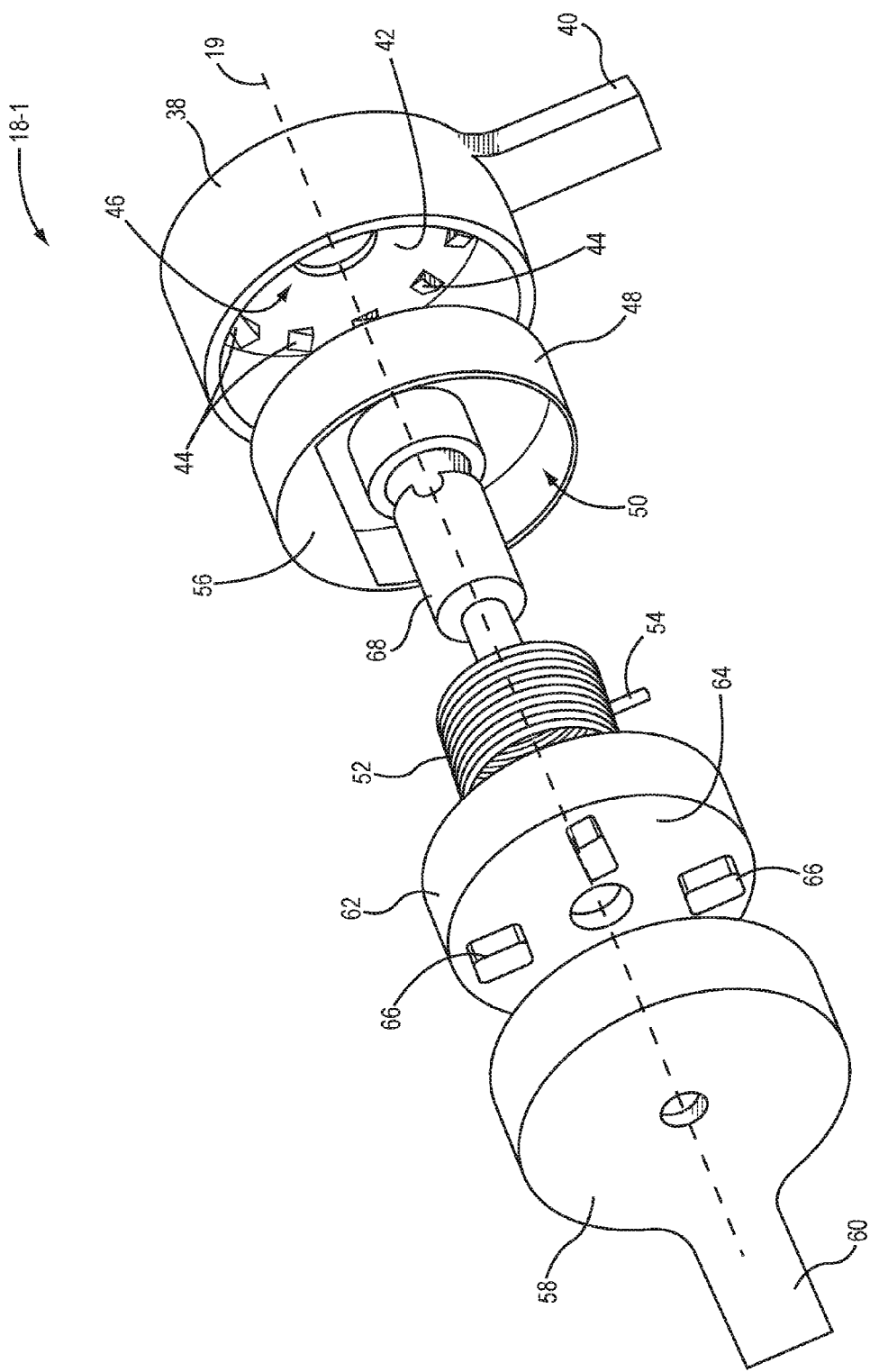
FIG. 2 is a first exploded view of a hip joint according to one embodiment.

FIG. 2 is a first exploded view of a hip joint 18-1 comprising an adjustable force mechanism according to one embodiment. The hip joint 18-1 has the rotation axis 19 about which a first member 38 rotates. The first member 38 has a cup shape, and a lower body connection location 40 for connection or direct coupling with the lower body link 20 (FIG. 1). In some embodiments, the lower body connection location 40 and the lower body link 20 are integrated with one another and formed together during manufacturing. In other embodiments, the lower body connection location 40 is separate from the lower body link 20 and is subsequently coupled to the lower body link 20 after manufacture.

The first member 38 comprises a planar face 42 on which a plurality of angled pawl teeth 44 are annularly disposed. The first member 38 forms a void 46 in which a ratchet drum 48 resides. The ratchet drum 48 forms a void 50 configured to receive a portion of a torsion spring 52 and a first spring leg 54. The torsion spring 52 has a rotation axis that is collinear with the rotation axis 19. The first spring leg 54 is rotationally coupled to the first member 38 via the ratchet drum 48 to thereby impart torque upon the first member 38 when twisted. A stop 56 is positioned or otherwise formed in the void 50 and is configured to limit rotation of the first spring leg 54 in the void 50. A second member 58 also rotates about the rotation axis 19. The second member 58 has a cup shape and has an upper body connection location 60 for connection or direct coupling with the upper body link 16 (FIG. 1). In some embodiments, the upper body connection location 60 and the upper body link 16 are integrated with one another, and formed together during manufacturing. In other embodiments, the upper body connection location 60 is separate from the upper body link 16 and is subsequently coupled to the upper body link 16 after manufacture.

The second member 58 forms an interior void (illustrated in FIG. 3) in which a cup 62 is positioned. The cup 62 includes a planar face 64 and a plurality of extensions 66 extending therefrom.

The first member 38, ratchet drum 48, torsion spring 52, cup 62, and second member 58 each form respective openings in which a shaft 68 is positioned, and about which the various components can at least partially rotate.

Figure 3:
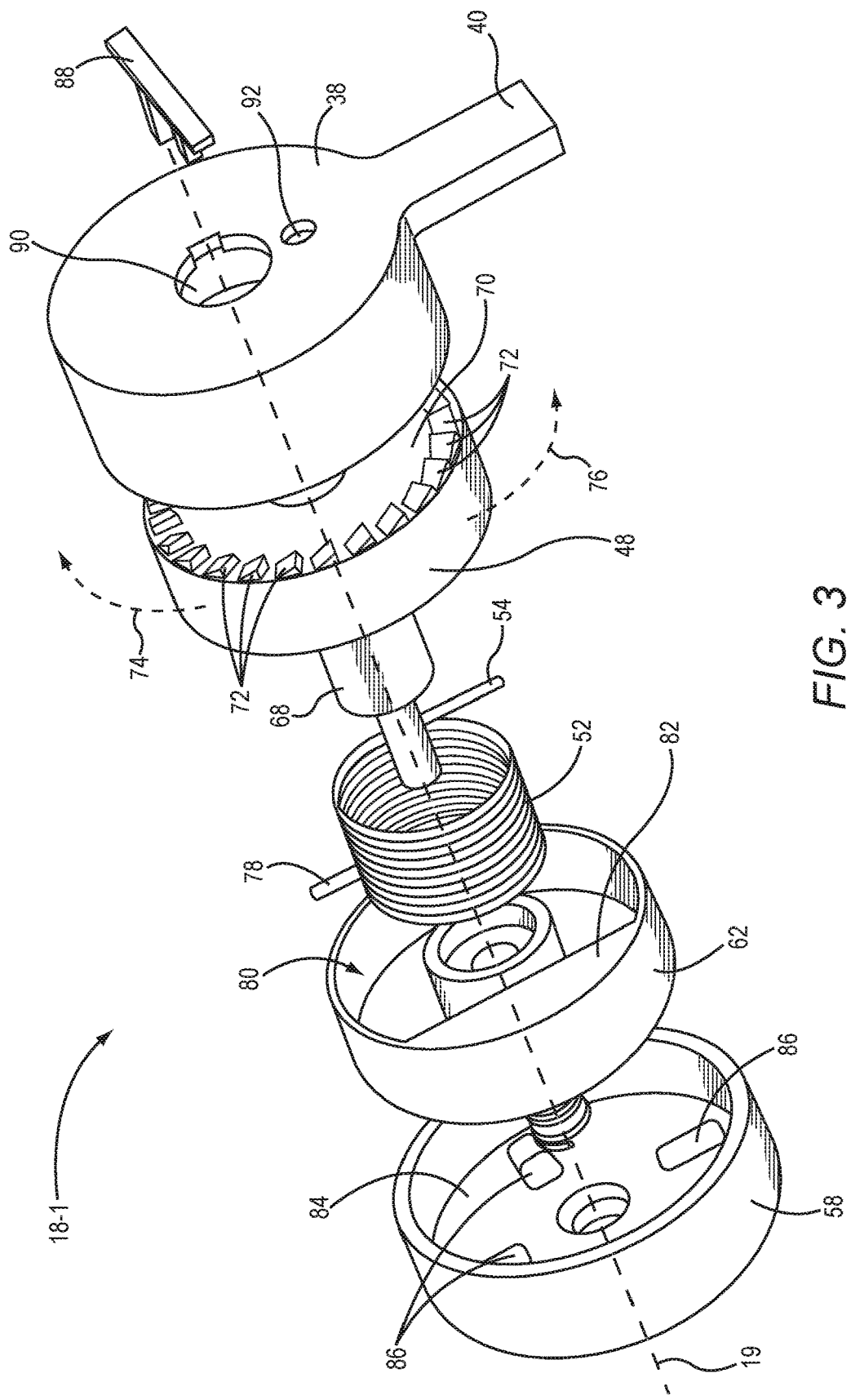
FIG. 3 is a second exploded view of the hip joint illustrated in FIG. 2.

FIG. 3 is a second exploded view of the hip joint 18-1. The ratchet drum 48 includes a planar face 70 on which a plurality of angled ratchet teeth 72 are disposed. The angled ratchet teeth 72 and angled pawl teeth 44 (FIG. 2) are configured to allow rotation in a first rotational direction 74 of the angled ratchet teeth 72 with respect to the angled pawl teeth 44 when in contact with one another, and to prohibit rotation in a second rotational direction 76 of the angled ratchet teeth 72 with respect to the angled pawl teeth 44 when in contact with one another.

The cup 62 is coupled between the torsion spring 52 and the second member 58. The cup 62 forms an interior void 80 configured to receive a second spring leg 78 of the torsion spring 52, and a stop 82 positioned in the interior void 80 configured to limit rotation of the second spring leg 78. The second spring leg 78 is rotationally coupled to the second member 58 via the cup 62 to thereby impart torque upon the second member 58 when twisted. The second member 58 has a planar face 84 and a plurality of openings 86 configured to receive the plurality of extensions 66 (FIG. 2) to prevent rotation of the cup 62 with respect to the second member 58.

In operation, a tool, such as a key 88, may be inserted into a slotted opening 90 and may be rotated, which in turn rotates the ratchet drum 48. As the ratchet drum 48 rotates, the torsion spring 52 rotates, increasing the torsional force imparted by the torsion spring 52. When a desired amount of pre-loaded torsional force is generated, the key 88 may be withdrawn, and the ratchet drum 48 is prevented from rotating in the second rotational direction 76 by the pawl teeth 44. Thus, an adjustable force may be applied to the first member 38 and the second member 58 to inhibit rotation of the first member 38 and the second member 58 in a particular rotational direction. The amount of torsional force provided differs depending on the pre-loaded torsional force, and upon characteristics of the torsion spring 52. For applications wherein relatively heavy tools 30 may be used, a relatively thick torsion spring 52 that can apply relatively high torsional forces may be utilized in the hip joint 18-1.

In operation, if it is desired that the adjustable force be eliminated, an elongated tool (not illustrated) may be inserted into a release opening 92 to disengage the ratchet teeth 72 from the pawl teeth 44, and thereby allow the torsion spring 52 to rapidly unwind.

Figure 4:
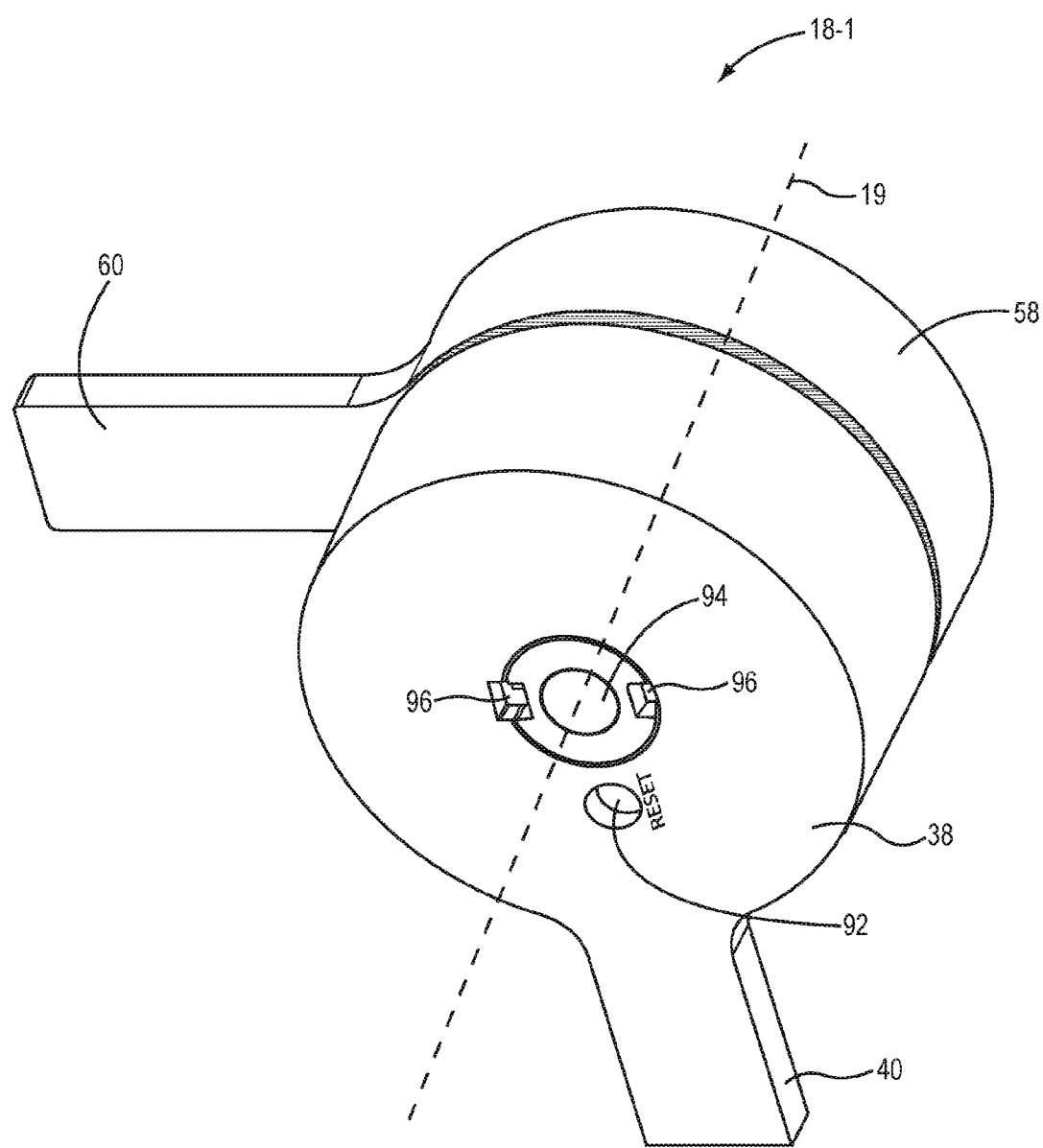
FIG. 4 is a perspective few of the hip joint in an operational state according to one embodiment.

FIG. 4 is a perspective view of the hip joint 18-1 in an operational state according to one embodiment. A bolt 94 or other structure holds the hip joint 18-1 together. When a tool 30 is coupled to the exoskeleton 10, the key 88 (FIG. 3) or other tool may be inserted into slots 96 to variably adjust the rotational forces provided by the hip joint 18-1 to counter the weight of the tool 30. When the tool 30 is removed from the exoskeleton 10, an elongated tool (not illustrated) may be inserted into the release opening 92 to disengage the ratchet teeth 72 from the pawl teeth 44, and thereby allow the torsion spring 52 to rapidly unwind, such that the hip joint 18-1 provides no rotational force.

In one embodiment, the hip joint 18-1 has a preloaded mode and a non-preloaded mode. In the non-preloaded mode, the upper body connection location 60 is at about a 90 degree orientation with respect to the lower body connection location 40.

Figure 5:
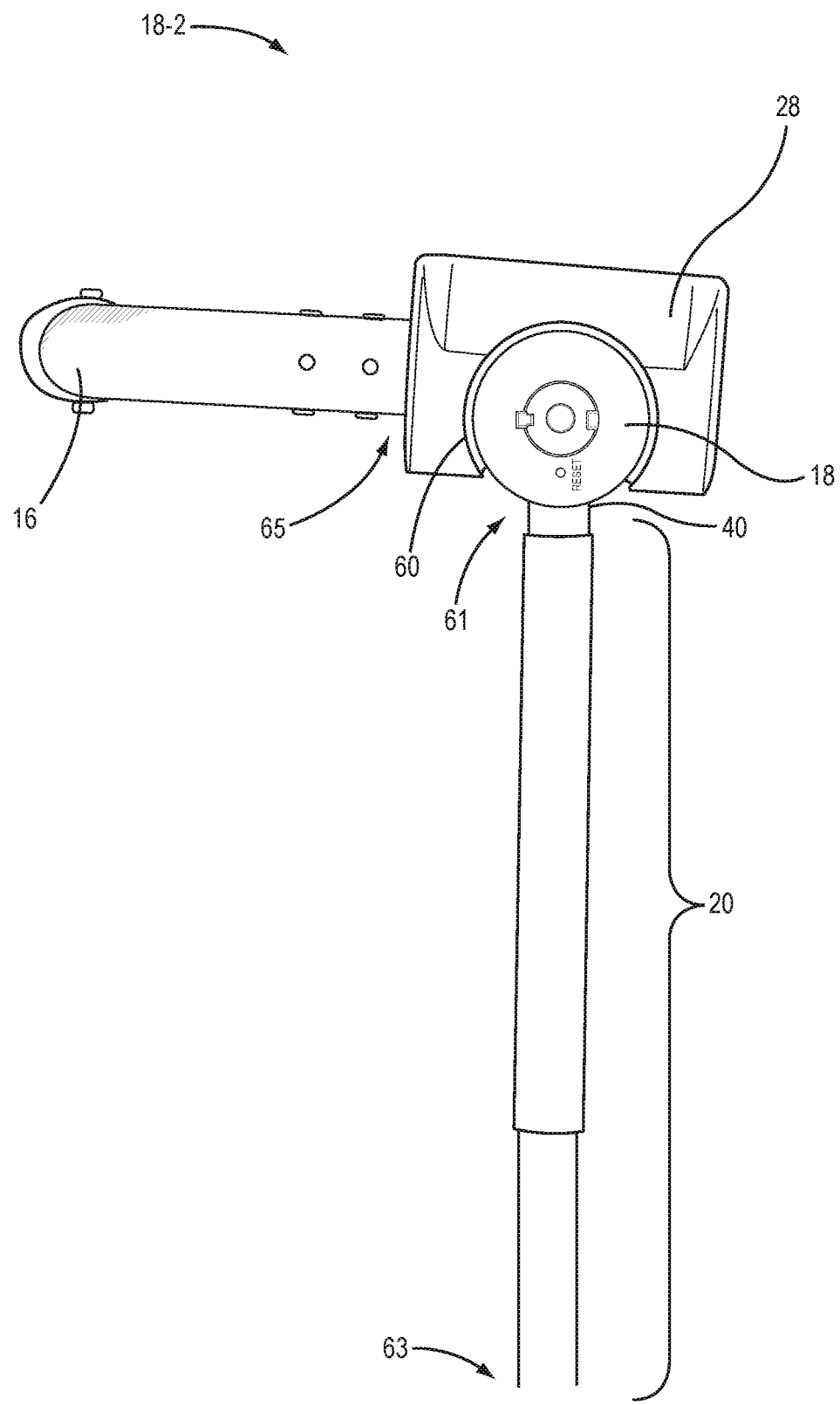
FIG. 5 is a diagram of the hip joint illustrated in FIGS. 3 and 4 wherein the hip joint is integrated with a lower body link and an upper body link during manufacturing.

FIG. 5 is a diagram of a hip joint 18-2 wherein the hip joint 18-2 is integrated with the lower body link 20 and the upper body link 16 during manufacturing. The lower body link 20 is at least partially rotatable about the rotation axis 19 (FIG. 4), and includes a lower body link hip joint end 61 and a lower body link distal end 63. The upper body link 16 is also at least partially rotatable about the rotation axis 19. The upper body link 16 has an upper body link hip joint end 65. The hip joint 18-2 is otherwise identical to the hip joint 18-1 as discussed above.

Figure 6:
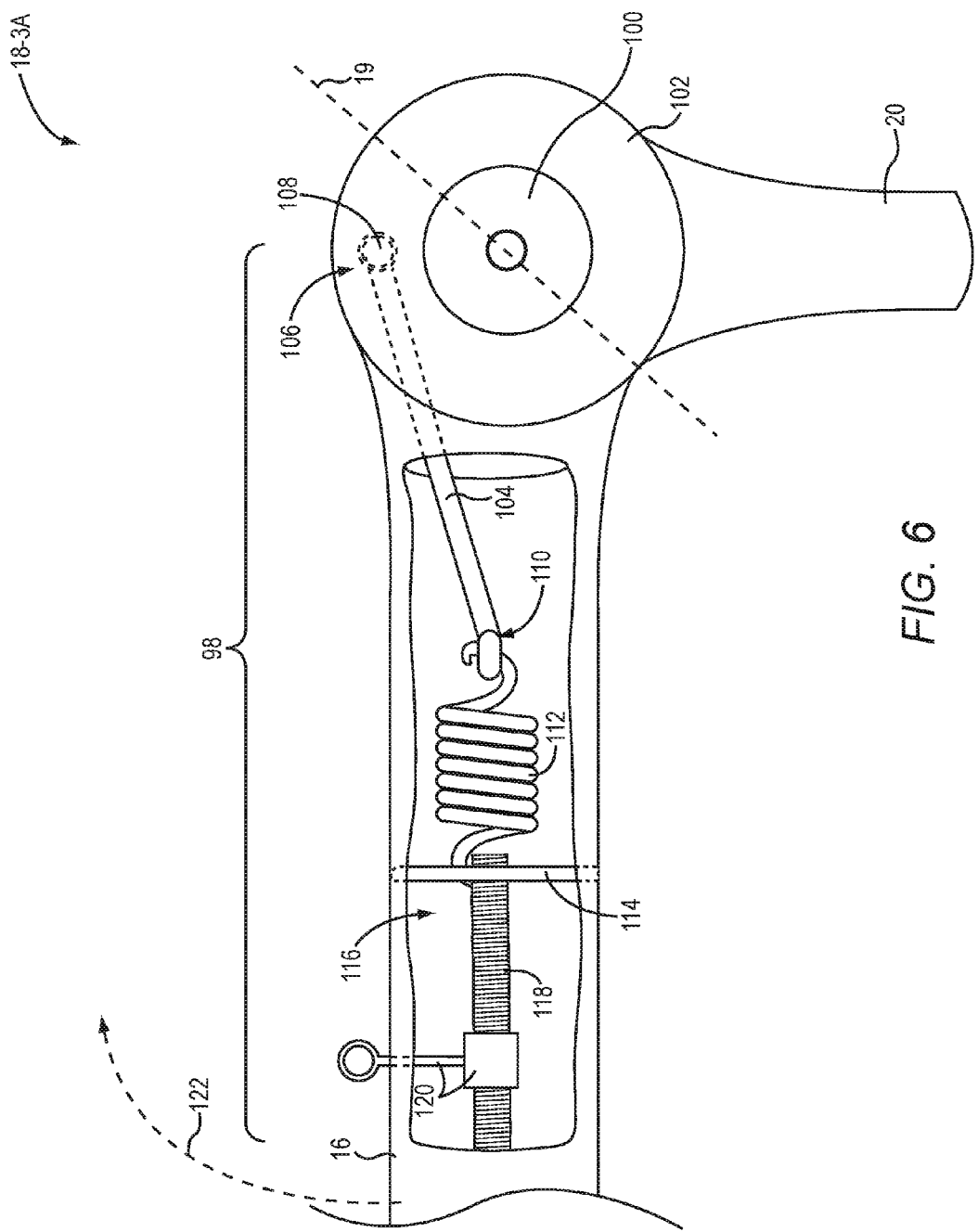
FIG. 6 illustrates a hip joint according to another embodiment.

FIG. 6 illustrates a hip joint 18-3A according to another embodiment. The tool assembly connector 28 is not illustrated for purposes of clarity. In this embodiment, parts of an adjustable force mechanism 98 are housed in either the upper body link 16 or the lower body link 20. In this embodiment, the upper body link 16 includes a shaft 100. The lower body link 20 includes a ring member 102 that is fixed with respect to the lower body link 20 and that is capable of at least partial rotation about the shaft 100.

A rod 104 is coupled at one end 106 to the ring member 102 via a hinge 108. Another end 110 of the rod 104 is coupled to an extension spring 112. The extension spring 112 is also coupled to a disk 114 that has a perimeter shaped to fit snugly within a chamber 116 of the upper body link 16, but is capable of movement along a longitudinal axis of the upper body link 16. The disk 114 forms a threaded opening that receives a threaded rod 118. A rotation mechanism 120 is configured to rotate the threaded rod 118 to slide the disk 114 with respect to the upper body link 16 and thereby apply tension to the extension spring 112. Increases in tension of the extension spring 112 increase the amount of force necessary to rotate the upper body link 16 with respect to the lower body link 20 in a rotational direction 122.

In one embodiment, the rotation mechanism 120 comprises a ratchet and pawl mechanism, and includes a user-selectable quick release mechanism which, when activated, allows the extension spring 112 to rapidly return to a non-tensioned state.

While for purposes of illustration the adjustable force mechanism 98 is depicted as being housed in the upper body link 16, it will be apparent that the adjustable force mechanism 98 could alternatively be housed in the lower body link 20. In such embodiment, the lower body link 20 may include the shaft 100, and the upper body link may include the ring member 102.

Figure 7:
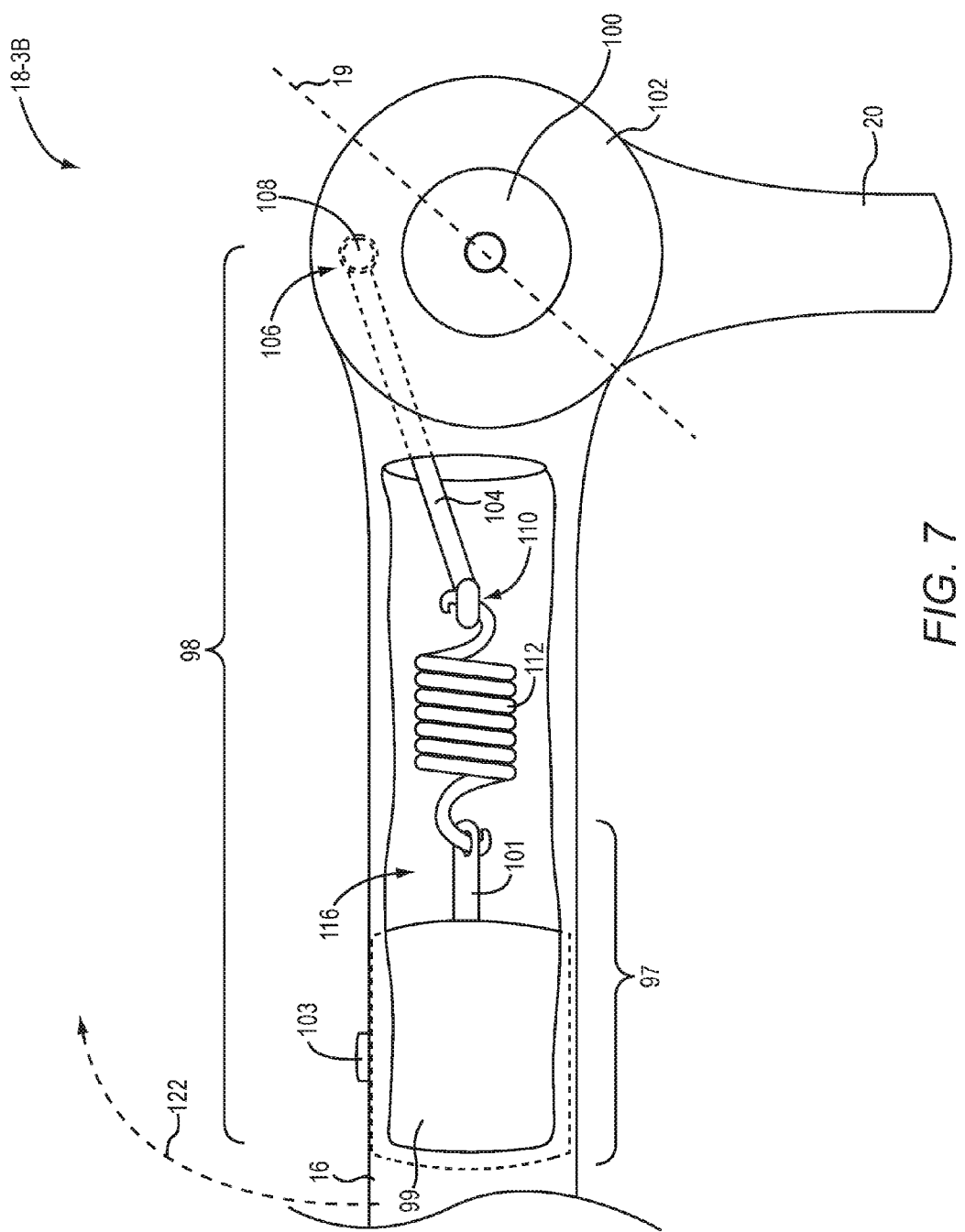
FIG. 7 illustrates a hip joint according to another embodiment.

FIG. 7 illustrates a hip joint 18-3B according to another embodiment. The hip joint 18-3B is substantially similar to the hip joint 18-3A illustrated in FIG. 6, except that the hip joint 18-3B includes an actuator 97. The actuator 97 includes an actuator motor 99 and an actuator arm 101. The motor 99 is housed within and fixed with respect to the upper body link 16. The motor 99 is configured to selectively extend or retract the actuator arm 101 in response to actuation of a switch 103 by the user. The position of the actuator arm 101 determines the force imparted upon the ring member 102 via the rod 104 and the extension spring 112.

Figure 8:
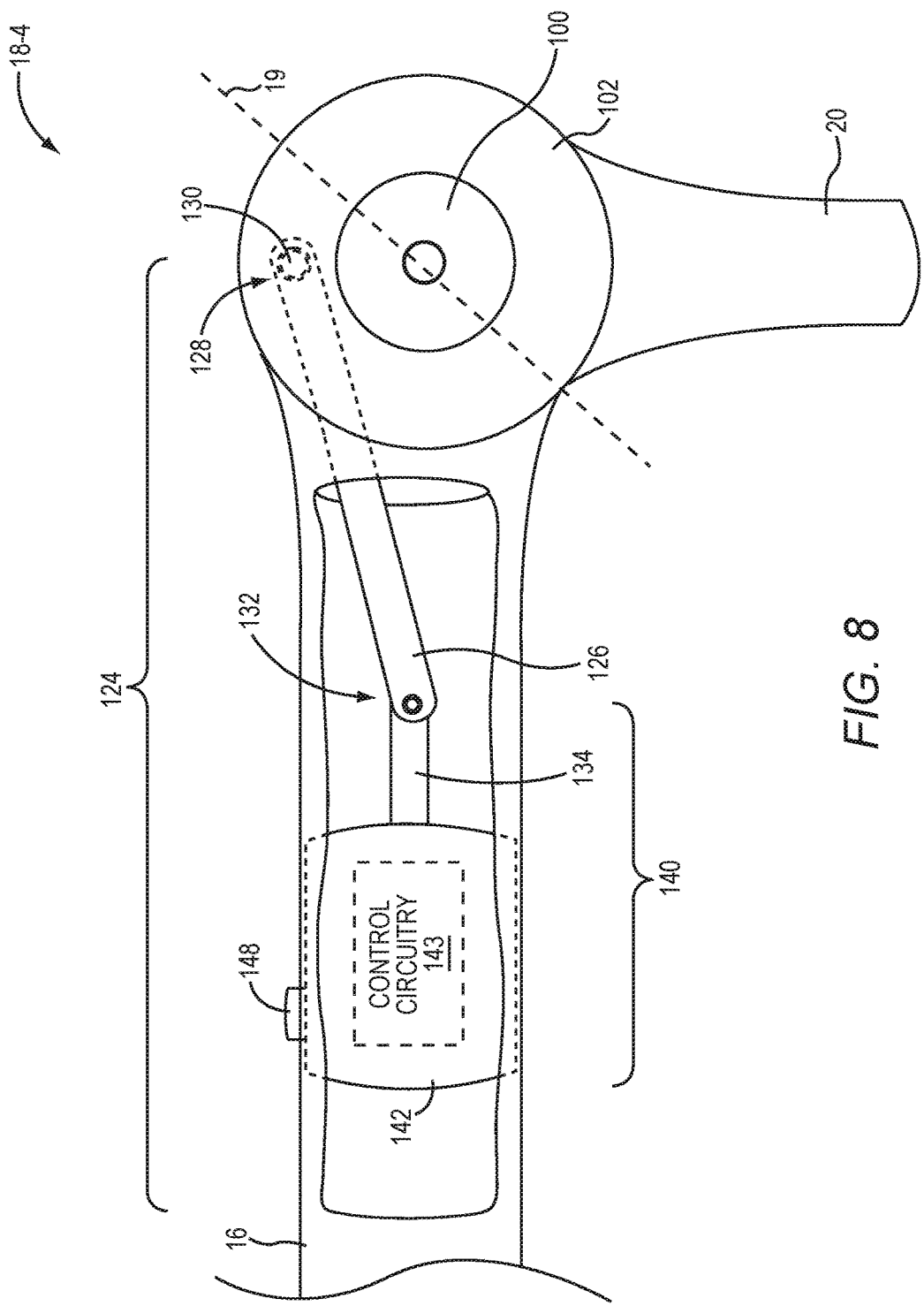
FIG. 8 illustrates a hip joint according to another embodiment.

FIG. 8 illustrates a hip joint 18-4 according to another embodiment. The tool assembly connector 28 is not illustrated for purposes of clarity. In this embodiment, parts of an adjustable force mechanism 124 are housed in either the upper body link 16 or the lower body link 20. In this embodiment, the upper body link 16 includes the shaft 100. The lower body link 20 includes the ring member 102 that is fixed with respect to the lower body link 20 and that is capable of at least partial rotation about the shaft 100.

A rod 126 is coupled at one end 128 to the ring member 102 via a hinge 130. Another end 132 of the rod 126 is hingedly coupled to an actuator arm 134 of an actuator 140. The actuator 140 includes a motor 142. The motor 142 is housed within and fixed with respect to the upper body link 16. The motor 142 is configured to selectively extend or retract the actuator arm 134. The position of the actuator arm 134 determines the relative location of the upper body link 16 with respect to the lower body link 20. In one embodiment, once set in a desired position, the actuator arm 134 maintains the relative location of the upper body link 16 with respect to the lower body link 20 in a fixed position, thereby preventing rotation of the upper body link 16 with respect to the lower body link 20. In other embodiments, control circuitry 143 allows, upon a predetermined amount of force, controlled lateral movement of the actuator arm 134 to permit rotation of the upper body link 16 with respect to the lower body link 20.

The actuator arm 134 may have a neutral position, such that no force is applied to the ring member 102 and such that the upper body link 16 may rotate unhindered with respect to the lower body link 20. A user-selectable variable switch 148 may allow the user to operate the motor 142 to extend the actuator arm 134 to a desired position, retract the actuator arm 134 to a desired position, or place the actuator arm 134 in the neutral position.

While for purposes of illustration the adjustable force mechanism 124 is depicted as being housed in the upper body link 16, it will be apparent that the adjustable force mechanism 124 could alternatively be housed in the lower body link 20. In such embodiment, the lower body link 20 may include the shaft 100, and the upper body link may include the ring member 102.

Figure 9:
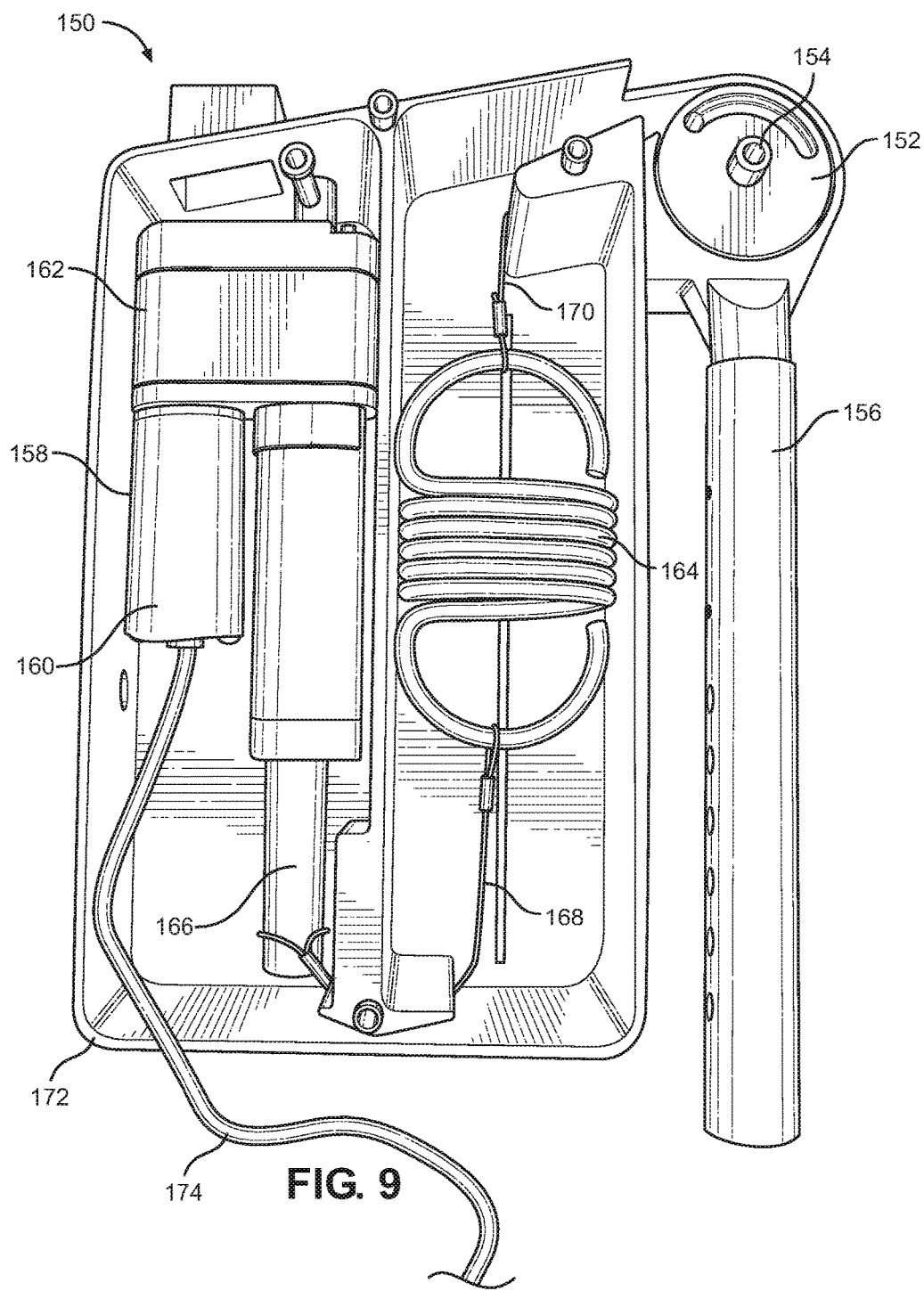
FIG. 9 illustrates an internal view of an adjustable force mechanism for a hip joint, according to another embodiment.

FIG. 9 illustrates an internal view of a system 150 including a hip joint 152 having an adjustable force mechanism, according to another embodiment. The hip joint 152 has a rotation axis 154, which permits rotation of a lower body link 156 with respect to the hip joint 152. In this embodiment, the hip joint 152 includes an adjustable force mechanism 158 comprising a motor 160 operably coupled to a piston mechanism 162. An extension spring 164 is coupled between the lower body link 156 and the piston mechanism 162 to provide passive resistance against rotation of the lower body link 156, similar to the extension spring 112 of FIG. 6 above, for example. In this embodiment, the extension spring 164 is coupled to a movable piston 166 of the piston mechanism 162 via a cable 168, and is coupled to the lower body link 156 via another cable 170.

The piston 166 is selectively movable by the piston mechanism 162 to increase or decrease an amount of tension in the extension spring 164, thereby increasing or decreasing a resistance to rotation of the lower body link 156 with respect to the hip joint 152. In this embodiment, the adjustable force mechanism 158 and extension spring 164 are contained within a housing 172 to protect the component parts of the adjustable force mechanism 158 and extension spring 164. In this example, a power cable 174 is connected to the motor 160 and is configured to provide a power signal configured to operate the motor 160 in order to selectively move the piston 166. As will be discussed in greater detail with respect to FIG. 15 below, the power signal may be selectively and/or automatically provided by a controller based on a predetermined controller logic.

Figure 10:
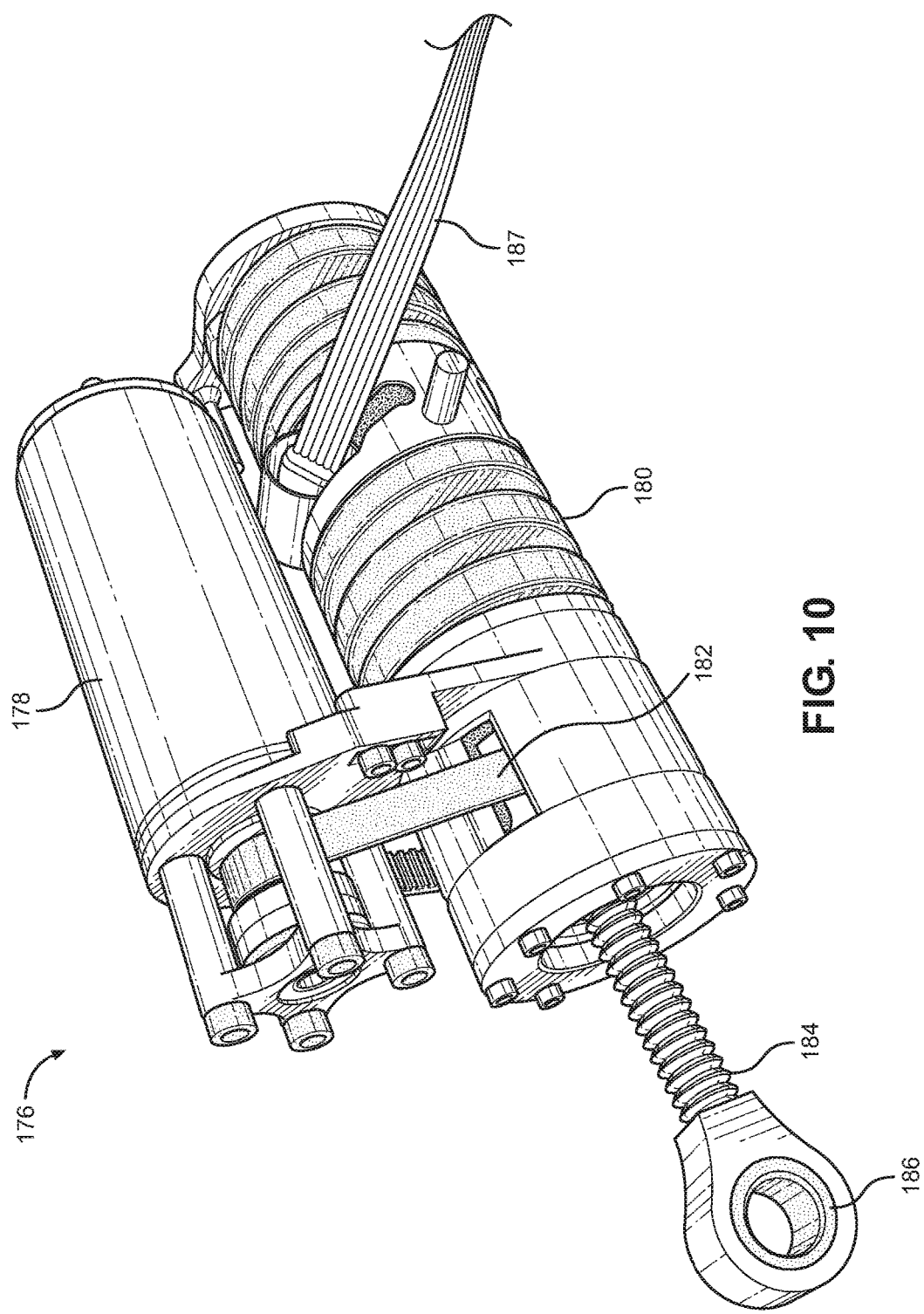
FIG. 10 illustrates an actuator suitable for use as part of an adjustable force mechanism, according to another embodiment.

According to another embodiment, FIG. 10 illustrates an actuator 176 suitable for use as part of an adjustable force mechanism, such as the adjustable force mechanism 158 of FIG. 9 above, for example. In this example, the actuator 176 includes a motor 178 coupled to a screw mechanism 180 via a drive belt 182. The screw mechanism 180 is configured to extend or retract a screw piston 184 in response to rotation of the drive belt 182 by the motor 178. The actuator 176 in this embodiment is configured to be coupled to a lower body link of an exoskeleton. A bolt aperture 186 is disposed at the distal end of the screw piston 184 for engaging with a hip link of the exoskeleton to facilitate or inhibit rotation of the lower body link with respect to the hip link. A power cable 187 is configured to provide electrical power and/or signals to the motor 178 for selectively or automatically driving the motor 178.

Figure 11:
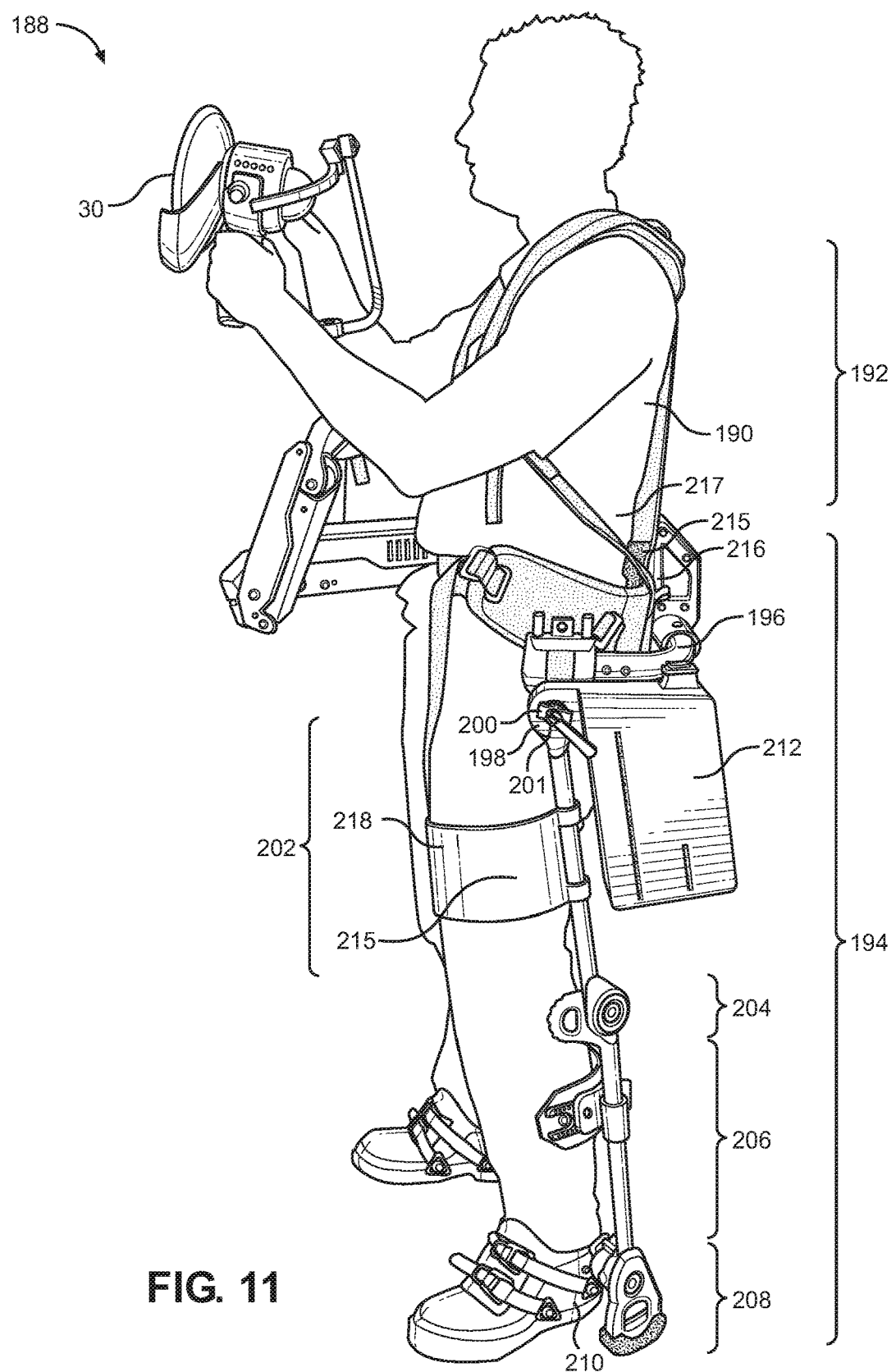
FIG. 11 is a side view of an exoskeleton being worn by a user, including an adjustable force mechanism according to another embodiment.

FIG. 11 is a side view of an exoskeleton 188 being worn by a user 190, according to another embodiment. In this example, similar to the exoskeleton 10 of FIG. 1 above, the exoskeleton 188 includes an upper body link 192 configured to support equipment, such as the tool 30, and a lower body link 194 rotatably coupled to the upper body link 192 via a hip link 196. The lower body link 194 is rotatable with respect to the hip link 196 via a hip joint 198 having a rotation axis 200. In this example, the hip joint 198 is manually lockable via a locking lever 201, to selectively inhibit or facilitate rotation of the lower body link 194 with respect to the hip link 196. The lower body link 194 also includes thigh link 202, knee joint 204, calf link 206, a rocker mechanism 208, and a foot link 210 similar to the lower body link 20 of FIG. 1 above, for example.

An adjustable force mechanism 212, similar to the adjustable force mechanism 158 of FIG. 9 above, is coupled to the hip link 196, and configured to selectively or automatically facilitate or inhibit rotation of the lower body link 194 with respect to the hip link 196. The adjustable force mechanism 212 may also be connected to one or more sensors 215. The sensors 215 may be in communication with a controller to provide input for the controller for controlling the operation of the adjustable force mechanism 212. In one embodiment, the sensors 215 may be configured to detect a force being applied to a portion of the exoskeleton 188 and/or the user 190, and generate a force signal indicative of a torque being applied thereto. For example, the sensor 215 may be connected to a back interface 216 configured to interface with a lower back 217 of the user 190 to detect movement of the back interface 216 corresponding to movement of the lower back 217 of the user 190 and/or otherwise measure a load being applied to the lower back 217 of the user 190. In response to receiving the force signal, the controller may be configured to determine the torque being applied to the lower back 217 of the user 190. In one embodiment, the adjustable force mechanism 212 may be configured to maintain a force on the hip joint 198 such that the torque being applied to the lower back 217 of the user 190 is maintained within a predetermined range corresponding to an acceptable level of exertion and/or fatigue for the user 190. In another embodiment, the sensor 217 may be connected to a leg interface 218 coupled to the thigh link 202, wherein the sensor 215 is connected to the leg interface 218 and configured to detect movement of the thigh link 202 corresponding to movement of a leg of the user 190.

Figure 12:
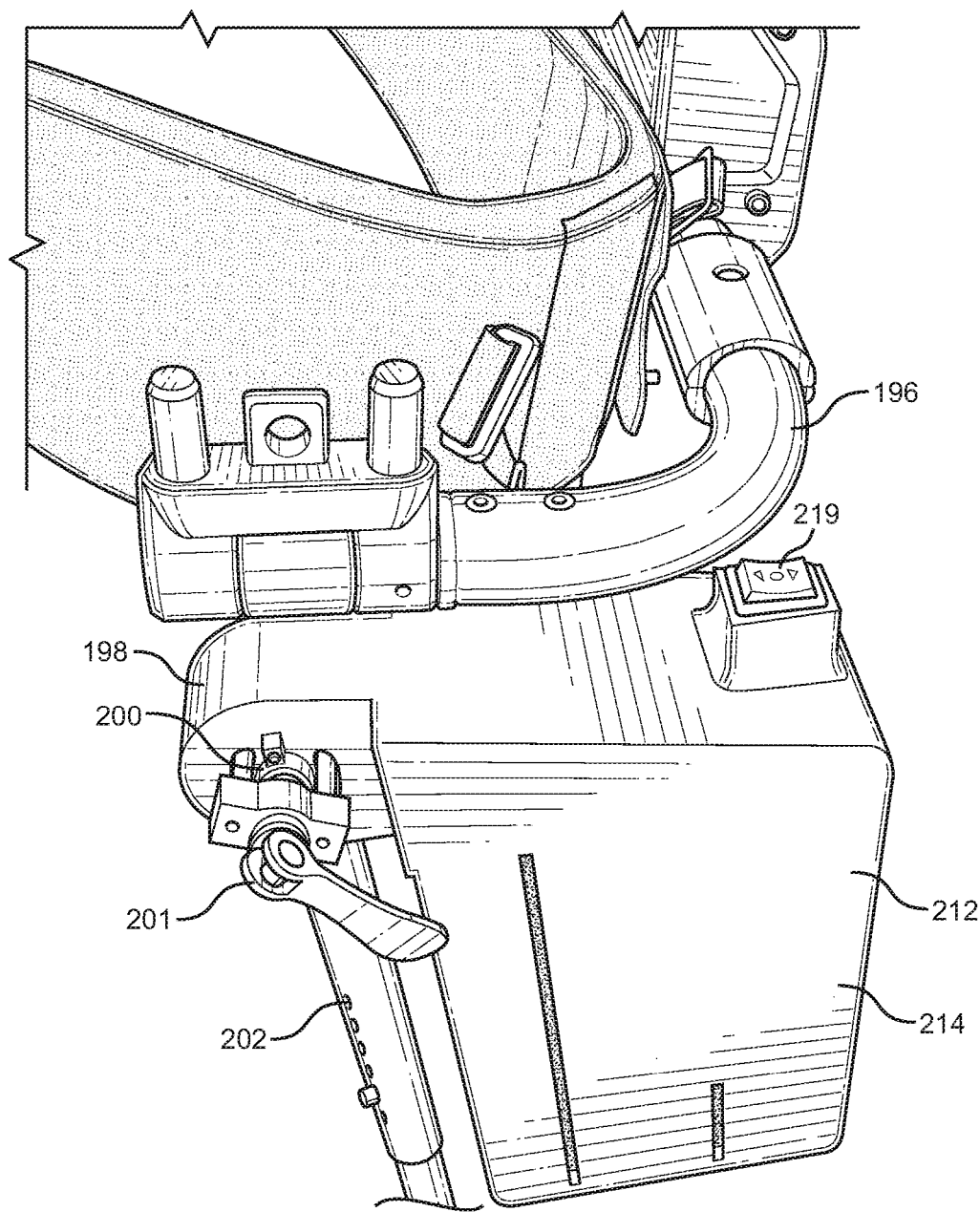
FIG. 12 is a perspective view of the adjustable force mechanism of the exoskeleton of FIG. 11.

Referring now to FIG. 12, a perspective view of the adjustable force mechanism 212, the adjustable force mechanism 212 includes a housing 214 having an actuation switch 219. In this example, operation of the actuation switch 219 by the user 190 operates the adjustable force mechanism 212 to facilitate or inhibit rotation of the lower body link 194 with respect to the hip link 196. In one example, the actuation switch 219 can be used to manually calibrate the controller to maintain the maintain a force on the hip joint 198 such that the torque being applied to the lower back 217 of the user 190 is maintained within a predetermined range corresponding to an acceptable level of exertion and/or fatigue for the user 190.

Figure 13A:
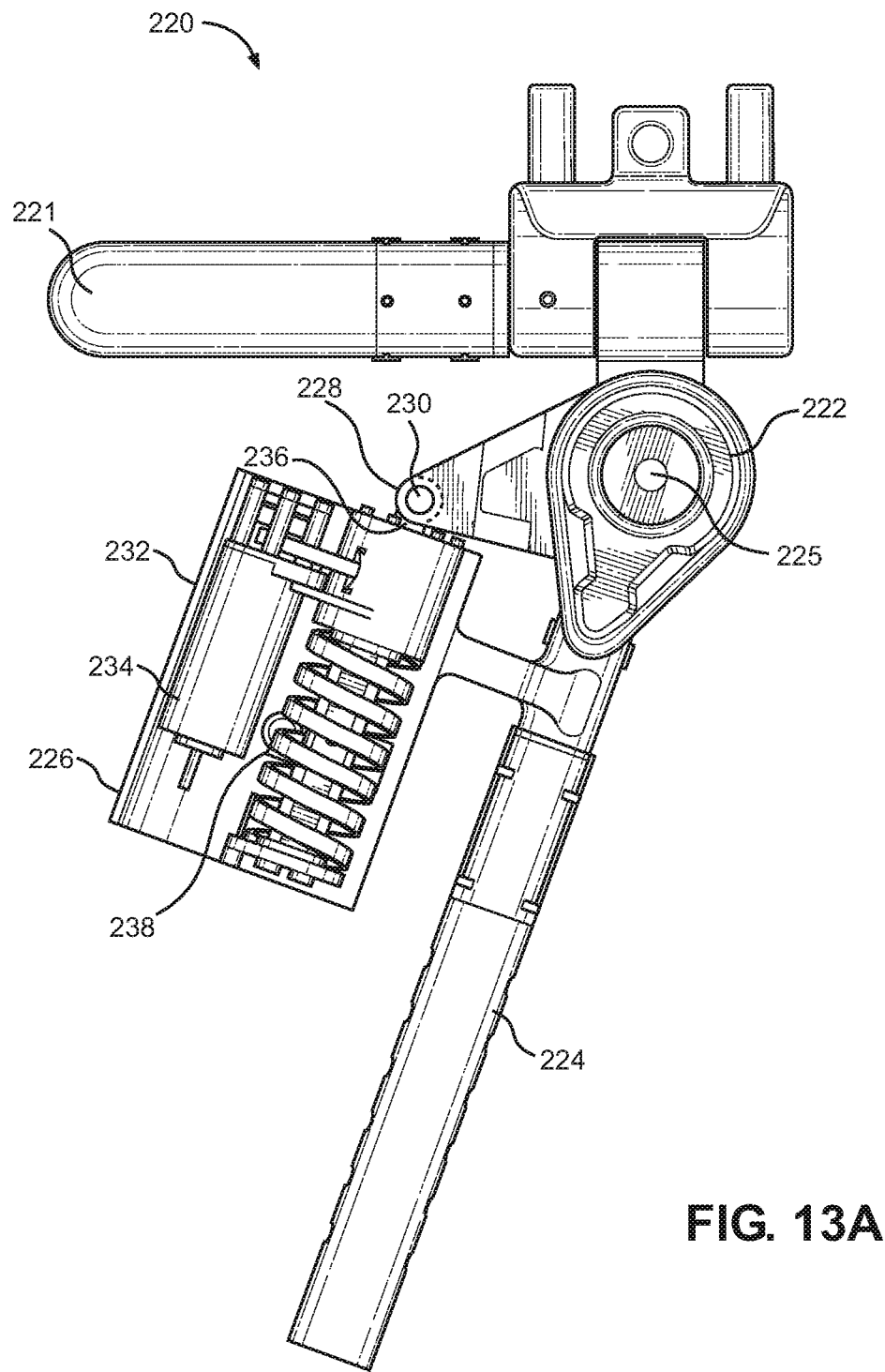
FIGS. 13A-13C are side views of an adjustable force mechanism for a hip joint in different positions during rotation of the hip joint, according to another embodiment.
Figure 13B:
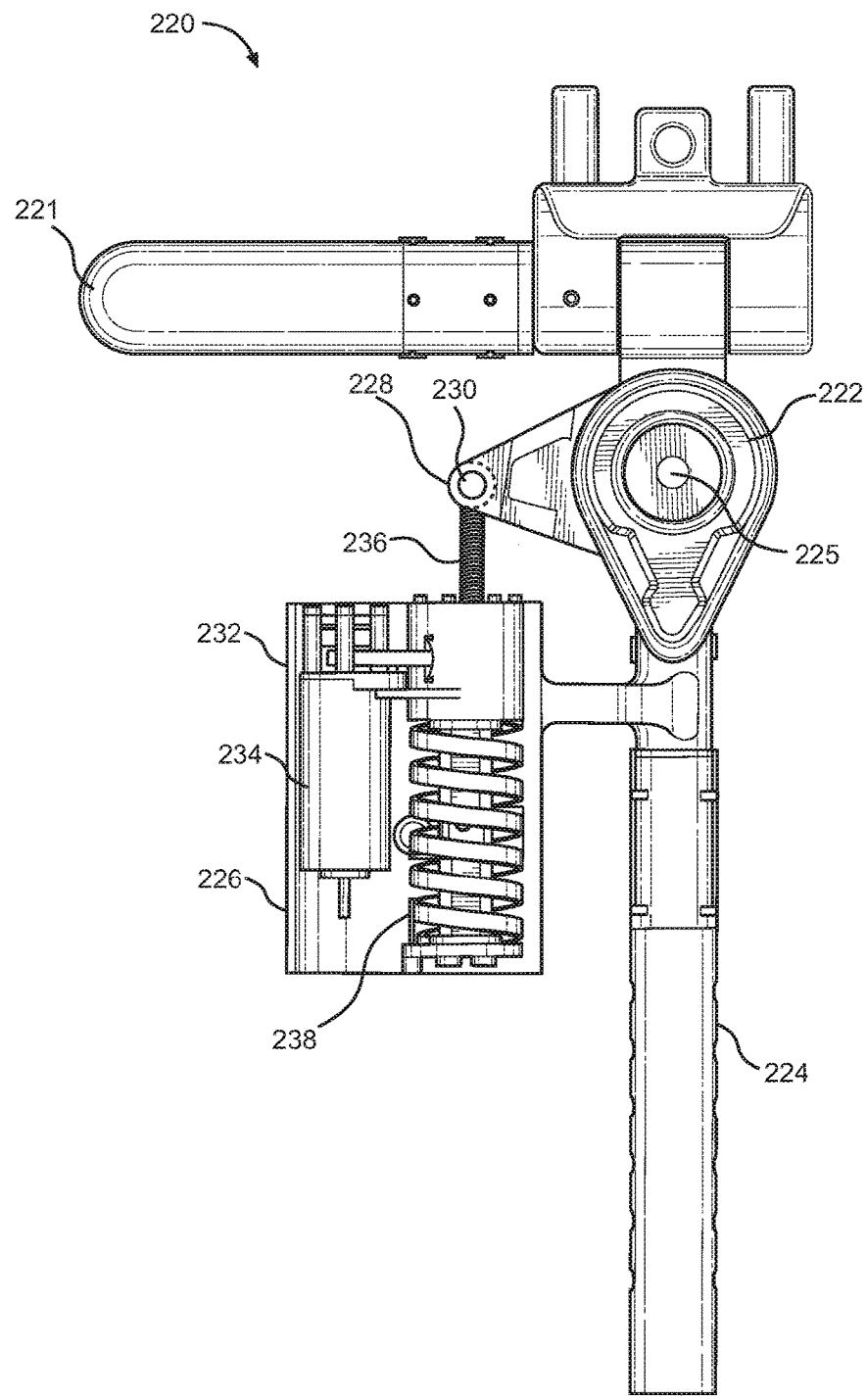
Figure 13C:
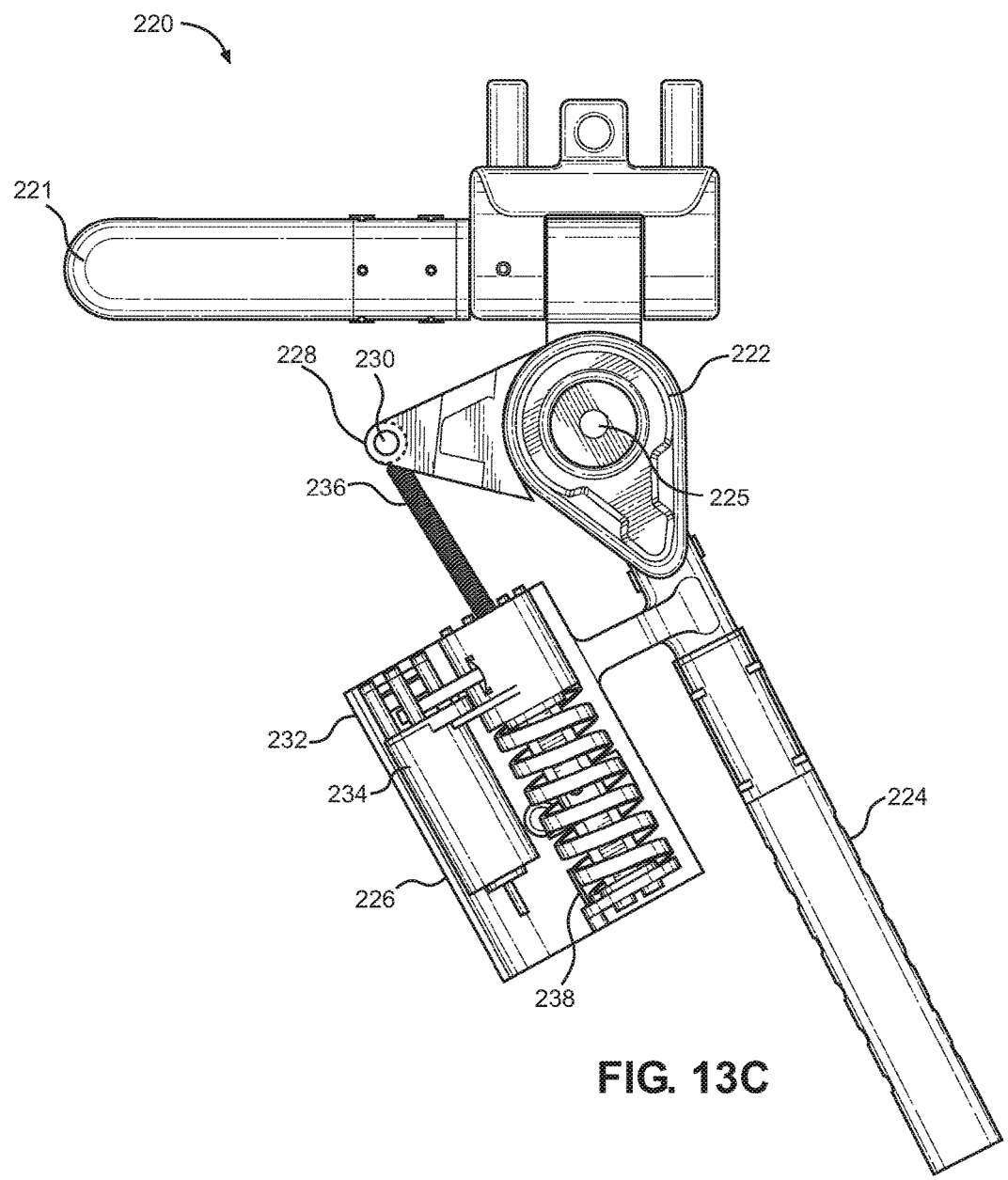

FIGS. 13A-13C are side views of a portion of an exoskeleton 220 having a hip link 221 with a hip joint 222 for rotating a lower body link 224 with respect to the hip link 221 about a rotation axis 225, according to another embodiment. An adjustable force mechanism 226, similar to the adjustable force mechanism 176 of FIG. 10 above, is configured to provide different levels of resistance at different positions of the lower body link 224 during rotation of the hip joint 222. In this embodiment, the adjustable force mechanism 226 is fixed with respect to the lower body link 224 and is rotatably coupled to a piston joint 228 having a rotation axis 230 that is fixed with respect to the hip link 221.

The adjustable force mechanism 226 may be disposed in a housing 232 and may include a motor 234 configured to selectively or automatically drive a piston 236 that is rotatably coupled to the piston joint 228. The adjustable force mechanism 226 in this example also includes a spring sensor subassembly 238 configured to deflect in response to forces applied to the hip joint 222. In response to these minor deflections, the spring sensor subassembly 238 may provide a signal to a controller (not shown), which in turn operates the adjustable force mechanism 226 to facilitate or inhibit rotation of the lower body link 224 with respect to the hip link 221. Thus, as the load, e.g., weight, carried by the exoskeleton 220 increases, the amount of force required by a user to maintain the lower body link 224 in a particular position with respect to the hip link 221 can be maintained or adjusted as needed, based on feedback from the spring sensor subassembly 238, thereby reducing fatigue and the risk of accident or injury.

Figure 14A:
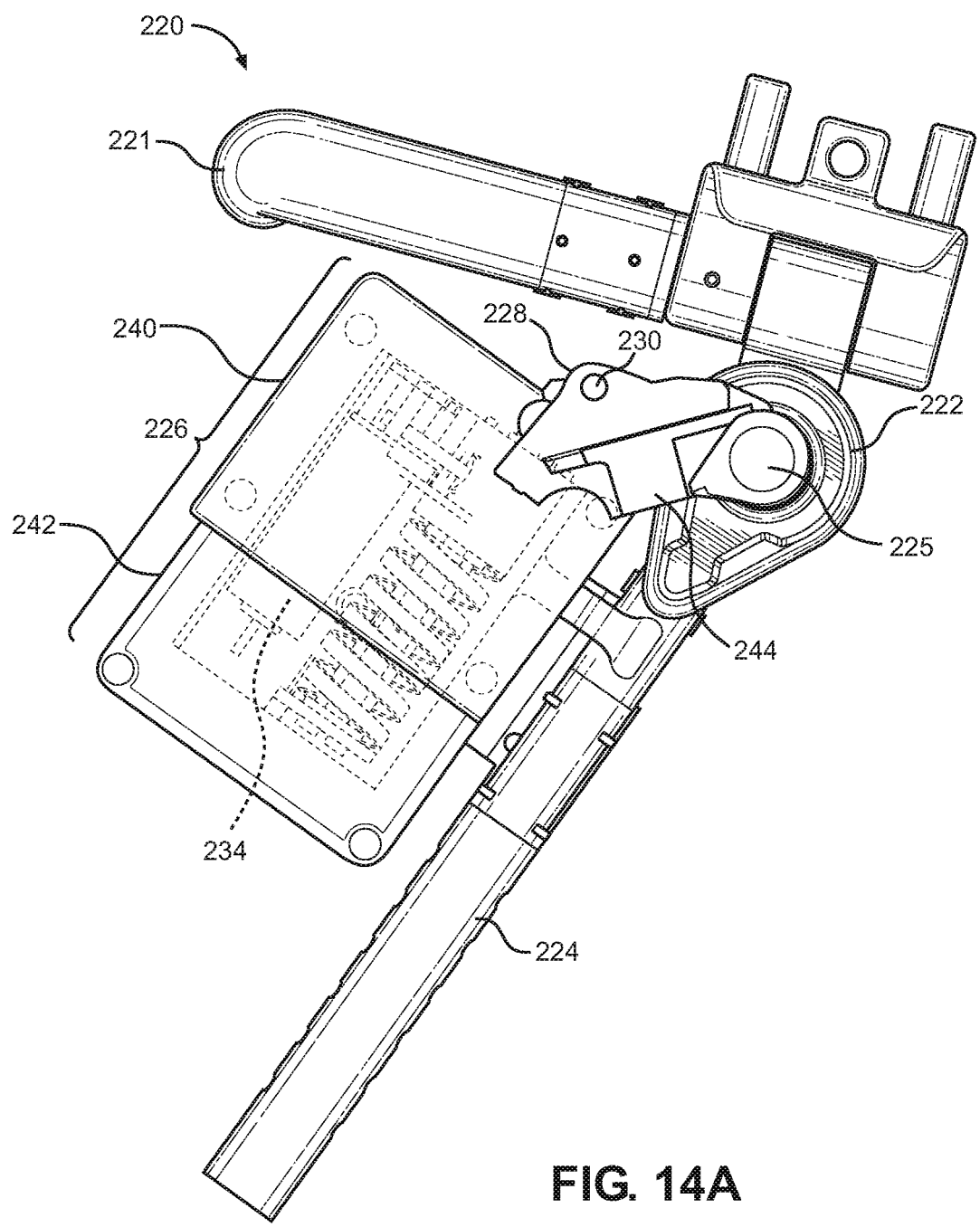
FIGS. 14A-14C are side views of the adjustable force mechanism for the hip joint of FIGS. 13A-13C including a housing for enclosing the adjustable force mechanism and portions of the hip joint.
Figure 14B:
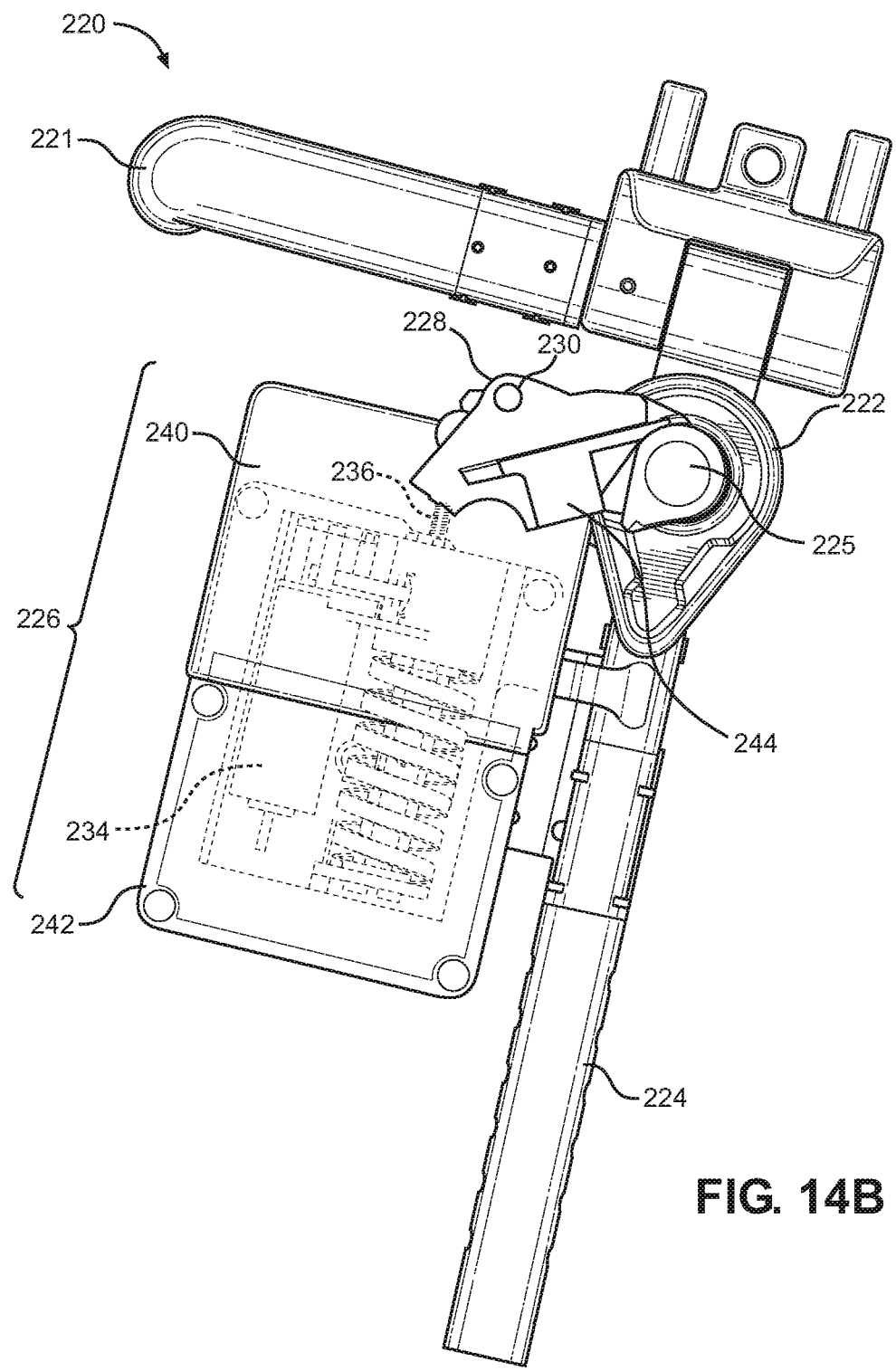
Figure 14C:
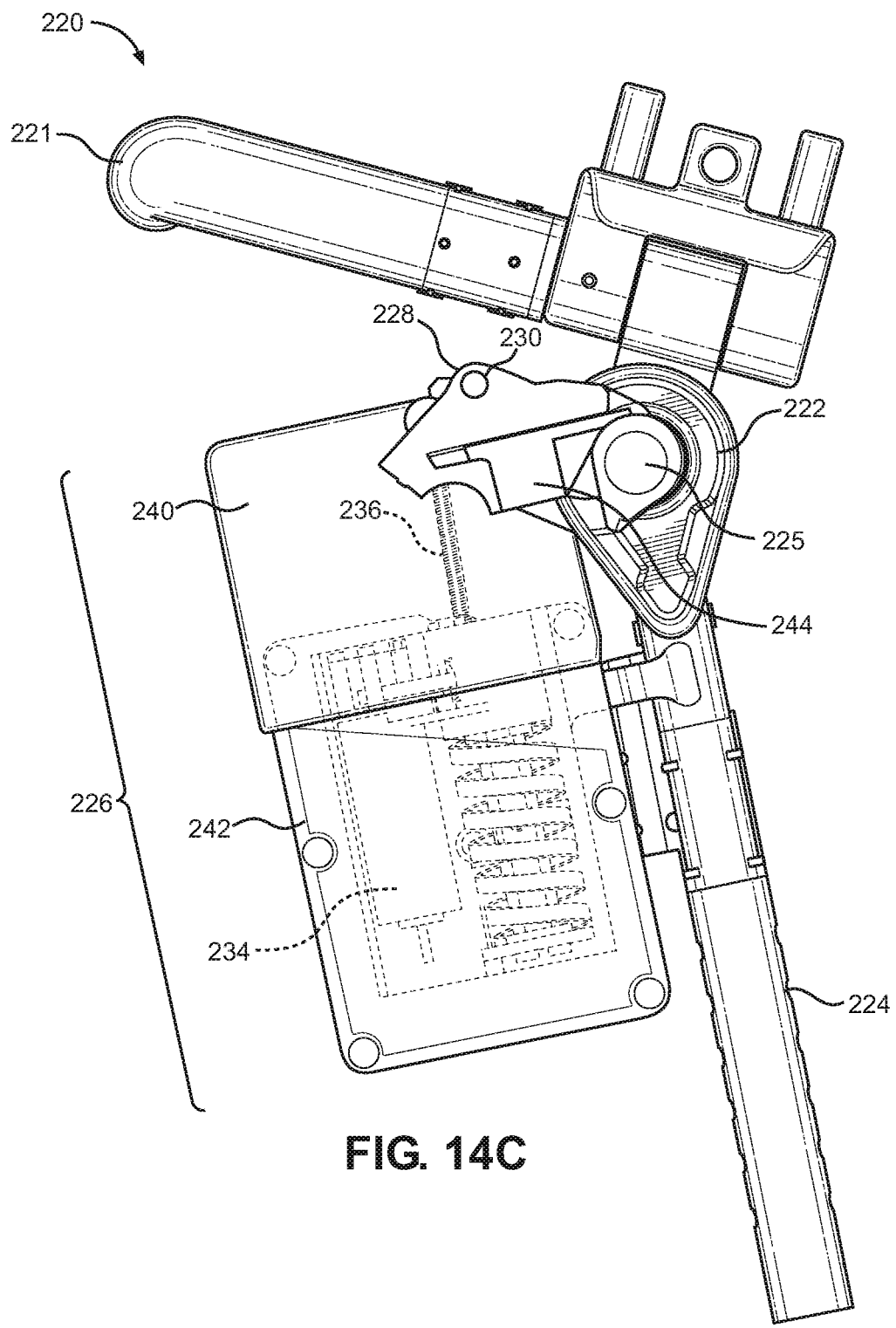

FIGS. 14A-14C are side views of the adjustable force mechanism 226 for the hip joint 222 of FIGS. 13A-13C including an upper housing member 240 and a lower housing member 242 for enclosing the adjustable force mechanism 226. In this example, the upper housing member 240 is slidable with respect to the lower housing member 242 to accommodate extension or retraction of the piston 236 while keeping the adjustable force mechanism 226 enclosed. A hip joint housing member 244 is also provided to enclose and protect components of the hip joint 222.

Figure 15:
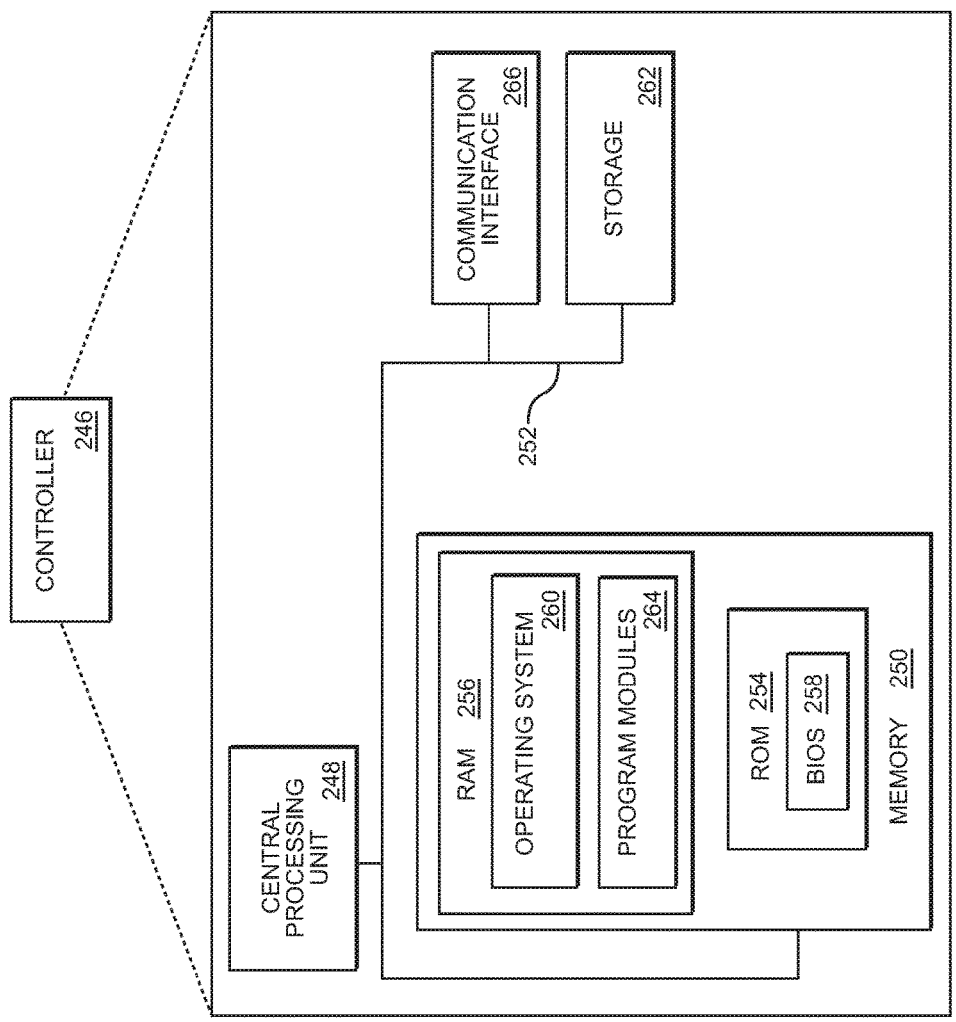
FIG. 15 is a block diagram of a controller configured to operate an adjustable force mechanism for a hip joint, according to another embodiment.

FIG. 15 is a block diagram of a controller 246, such as a computing device for example, suitable for implementing the functionality of various components discussed herein, such as operation of the adjustable force mechanisms described above. In some embodiments, such components may be implemented on separate controllers 246. In other embodiments, certain of the components may be implemented on a single controller 246. These are merely examples, and the particular implementation of functionality versus individual controllers 246 may be system- and design-dependent.

The controller 246 may comprise any computing or processing device capable of including firmware, hardware, and/or executing software instructions to implement the functionality described herein for the respective component. The controller 246 includes a central processing unit 248, sometimes referred to as a processor or micro-processor, a system memory 250, and a system bus 252. The system bus 252 provides an interface for system components including, but not limited to, the system memory 250 and the central processing unit 248. The central processing unit 248 can be any commercially available or proprietary processor.

The system bus 252 may be any of several types of bus structures that may further interconnect to a memory bus (with or without a memory controller), a peripheral bus, and/or a local bus using any of a variety of commercially available bus architectures. The system memory 250 may include non-volatile memory 254 (e.g., read only memory (ROM), erasable programmable read only memory (EPROM), electrically erasable programmable read only memory (EEPROM), etc.) and/or volatile memory 256 (e.g., random access memory (RAM)). A basic input/output system (BIOS) 258 may be stored in the non-volatile memory 254, and can include the basic routines that help to transfer information between elements within the controller 246. The volatile memory 256 may also include a high-speed RAM, such as static RAM for caching data.

The controller 246 may further include or be coupled to a computer-readable storage 262, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 262 and other drives, associated with computer-readable media and computer-usable media, may provide non-volatile storage of data, computer-executable instructions, and the like. Although the description of computer-readable media above refers to an HDD, it should be appreciated by those skilled in the art that other types of media which are readable by a computer, such as a solid state drives (SSD), floppy disks, magnetic cassettes, flash memory drives, flash memory cards, cartridges, optical media, and the like, may also be used in the exemplary operating environment, and further, that any such media may contain computer-executable instructions for performing novel methods of the disclosed architecture.

A number of modules can be stored in the computer-readable storage 262 and in the volatile memory 256, including an operating system 260 and one or more program modules 264, which may implement the functionality described herein in whole or in part. For example, the program modules 264 may include algorithms for selectively or automatically operating one of the adjustable force mechanisms 158, 176, 212, 226 of FIGS. 9-14C above, such as by operating one of the motors 160, 178, 234 for example.

All or a portion of the embodiments may be implemented as a computer program product stored on a transitory or non-transitory computer-usable or computer-readable storage medium, such as the computer-readable storage 262, which includes complex programming instructions, such as complex computer-readable program code, configured to cause the central processing unit 248 to carry out the steps described herein. Thus, the computer-readable program code can comprise software instructions for implementing the functionality of the embodiments described herein when executed on the central processing unit 248. The central processing unit 248, in conjunction with the program modules 264 in the volatile memory 256, may serve as a controller, or control system, for the controller 246 that is configured to, or adapted to, implement the functionality described herein. The controller 246 may also include a communication interface 266, suitable for communicating with the adjustable force mechanisms described above, and/or for communicating with other computing devices directly or via a network, as desired.

Those skilled in the art will recognize improvements and modifications to the preferred embodiments of the disclosure. All such improvements and modifications are considered within the scope of the concepts disclosed herein and the claims that follow.

What is claimed is:

1. A system comprising:
a hip joint comprising:
a first member rotatable about a hip joint rotation axis, the first member configured to be coupled to one of a lower body link or an upper body link; and
a second member rotatable about the hip joint rotation axis, the second member configured to be coupled to the other of the lower body link or the upper body link; and
an adjustable force mechanism coupled to at least one of the first member and the second member, the adjustable force mechanism comprising:
an actuator coupled to the first member, the actuator comprising a motor configured to selectively apply an adjustable force to the second member to inhibit rotation of the first member with respect to the second member; and
a controller in communication with the sensor, the controller configured to:
receive a force signal from a sensor;
determine, based on the force signal, a torque load associated with the hip joint; and
operate the motor, in response to the determined torque load, to selectively apply the adjustable force to maintain the torque load within a predetermined range.

2. The system of claim 1, further comprising the sensor in communication with the controller, the sensor configured to:
detect a force being applied to one of the system or a user of the system; and
generate the force signal indicative of the force being applied.

3. The system of claim 2, further comprising a back interface configured to interface with a back of the user, wherein the sensor is connected to the back interface and configured to detect movement of the back interface corresponding to movement of the back of the user.

4. The system of claim 2, further comprising a leg interface configured to interface with a leg of the user, wherein the sensor is connected to the leg interface and configured to detect movement of the leg interface corresponding to movement of the leg of the user.

5. The system of claim 1, wherein the controller is further configured to determine the torque load associated with the hip joint using a predictive algorithm.

6. The system of claim 1, wherein the adjustable force mechanism further comprises an actuator link coupled to the second member, and
wherein the actuator further comprises an actuator arm coupled to the actuator link, the motor configured to selectively extend or retract the actuator arm to apply the adjustable force to the second member.

7. The system of claim 6, wherein the actuator link comprises an extension spring coupled between the actuator arm and the second member, the extension spring configured to apply a biasing force to the second member in response to the motor selectively extending or retracting the actuator arm to apply the adjustable force to the second member.

8. The system of claim 6, wherein the actuator link comprises a hinge connection between the actuator arm and the second member.

9. The system of claim 1, further comprising:
the lower body link; and
the upper body link.

10. The system of claim 9, wherein the upper body link comprises a hip link configured to at least partially enclose hips of a user, the hip link configured to be, in operation, in a substantially horizontal plane, and the lower body link configured to be, in operation, in a substantially vertical plane.

11. The system of claim 1, wherein the adjustable force mechanism further comprises:
a user-selectable switch coupled to the actuator.

12. An exoskeleton comprising:
an upper body exoskeleton comprising an upper body link;
a lower body exoskeleton comprising a lower body link; and
a hip joint comprising:
a first member rotatable about a hip joint rotation axis, the first member coupled to one of the lower body link or the upper body link; and
a second member rotatable about the hip joint rotation axis, the second member coupled to the other of the lower body link or the upper body link; and
an adjustable force mechanism coupled to at least one of the first member and the second member, the adjustable force mechanism comprising:
an actuator coupled to the first member, the actuator comprising a motor configured to selectively apply an adjustable force to the second member to inhibit rotation of the upper body exoskeleton with respect to the lower body exoskeleton; and
a controller in communication with the sensor, the controller configured to:
receive a force signal from a sensor;
determine, based on the force signal, a torque load associated with the hip joint; and
operate the motor, in response to the determined torque load, to selectively apply the adjustable force to maintain the torque load within a predetermined range.

13. The exoskeleton of claim 12, further comprising the sensor in communication with the controller, the sensor configured to:
detect a force being applied to one of the exoskeleton or a user of the exoskeleton; and
generate the force signal indicative of the force being applied.

14. The exoskeleton of claim 13, wherein the upper body exoskeleton further comprises a back interface configured to interface with a back of the user, wherein the sensor is connected to the back interface and configured to detect movement of the back interface corresponding to movement of the back of the user.

15. The exoskeleton of claim 13, wherein the lower body exoskeleton further comprises a leg interface configured to interface with a leg of the user, wherein the sensor is connected to the leg interface and configured to detect movement of the leg interface corresponding to movement of the leg of the user.

16. The exoskeleton of claim 12, wherein the controller is further configured to determine the torque load associated with the hip joint using a predictive algorithm.

17. A method of operating a hip joint of an exoskeleton comprising:
receiving, by a controller, a force signal from a sensor;
determining, by the controller, a torque load associated with a hip joint of an exoskeleton based on the force signal, the hip joint comprising a first member configured to be coupled to one of a lower body link or an upper body link and a second member rotatable with respect to the first member, the second member configured to be coupled to the other of the lower body link or the upper body link; and operating a motor coupled to one of the first member or the second member to selectively apply an adjustable force to the other of the first member or the second member in response to the determined torque load to inhibit rotation of the first member with respect to the second member to maintain the torque load within a predetermined range.

18. The method of claim 17, further comprising:

detecting, by the sensor in communication with the controller, a force being applied to one of the exoskeleton or a user of the exoskeleton;

generating the force signal indicative of the force being applied; and providing the force signal to the controller, wherein determining, by the controller, the torque load is based on the force signal.

* * * * *